(12) United States Patent
Rzeszotarski et al.

(10) Patent No.: US 9,761,036 B2
(45) Date of Patent: Sep. 12, 2017

(54) METHODS AND SOFTWARE FOR VISUALIZING DATA BY APPLYING PHYSICS-BASED TOOLS TO DATA OBJECTIFICATIONS

(71) Applicant: Carnegie Mellon University, Pittsburgh, PA (US)

(72) Inventors: Jeffrey M. Rzeszotarski, Chesterland, OH (US); Aniket D. Kittur, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 76 days.

(21) Appl. No.: 14/696,053

(22) Filed: Apr. 24, 2015

(65) Prior Publication Data

US 2015/0310643 A1 Oct. 29, 2015

Related U.S. Application Data

(60) Provisional application No. 61/995,904, filed on Apr. 24, 2014.

(51) Int. Cl.
*G06T 11/20* (2006.01)
*G06T 13/80* (2011.01)
(Continued)

(52) U.S. Cl.
CPC ............ *G06T 13/80* (2013.01); *G06T 11/206* (2013.01); *G06T 13/20* (2013.01); *G06T 19/20* (2013.01);
(Continued)

(58) Field of Classification Search
None
See application file for complete search history.

(56) References Cited

U.S. PATENT DOCUMENTS

2010/0162152 A1* 6/2010 Allyn .................... G06F 3/0481
715/767
2011/0115814 A1 5/2011 Heimendinger et al.
(Continued)

OTHER PUBLICATIONS

Aguirregoitia, Amaia, et al. "Using the magnet metaphor for multivariate visualization in Software management." Actas de los Talleres de las Jornadas de Ingenieria del Software y Bases de Datos 4.1 (2010).*

(Continued)

*Primary Examiner* — Ryan D McCulley
(74) *Attorney, Agent, or Firm* — Downs Rachlin Martin PLLC

(57) ABSTRACT

Methods and corresponding software for allowing a user to manipulate and interactively explore data intuitively by objectifying the data and allowing the user to apply any one or more simulated physical tools to the objectified data. The data can be any suitable type of data, including multivariate data and graph (network) data. In some embodiments, the method displays user-selected charts, such as histograms, scattergrams, and network graphs, in which objectified data points, or simulated physical objects, are attracted to their proper charted locations. In some embodiments, the user can apply one or more simulated physical tools and/or other tools, such as physical-barrier-type filter tools (e.g., sieves) and/or optical filter lens tools, to the simulated physical objects to filter the data. In some embodiments, the user can apply multiple tools, with each tool leaving a visual trace that allows the user to easily retrace their data manipulations.

66 Claims, 17 Drawing Sheets

(51) Int. Cl.
*G06T 13/20* (2011.01)
*G06T 19/20* (2011.01)

(52) U.S. Cl.
CPC ............... *G06T 2219/2012* (2013.01); *G06T 2219/2016* (2013.01)

(56) References Cited

U.S. PATENT DOCUMENTS

| | | |
|---|---|---|
| 2012/0229466 A1 | 9/2012 | Riche et al. |
| 2013/0156318 A1* | 6/2013 | Beckman .............. G06T 11/206 382/190 |
| 2013/0275904 A1 | 10/2013 | Bhaskaran et al. |
| 2014/0149947 A1 | 5/2014 | Blyumen |
| 2014/0247268 A1* | 9/2014 | Drucker ................ G06T 11/206 345/440.2 |
| 2014/0282276 A1 | 9/2014 | Drucker et al. |
| 2014/0292765 A1* | 10/2014 | Maruyama ............ G06T 11/206 345/440 |

OTHER PUBLICATIONS

Spritzer, Andre Suslik, and Carla MDS Freitas. "A physics-based approach for interactive manipulation of graph visualizations." Proceedings of the working conference on Advanced visual interfaces. ACM, 2008.*

Stone, Maureen C., Ken Fishkin, and Eric A. Bier. "The movable filter as a user interface tool." Proceedings of the SIGCHI Conference on Human Factors in Computing Systems. ACM, 1994.*

Baur, Dominikus, Bongshin Lee, and Sheelagh Carpendale. "TouchWave: kinetic multi-touch manipulation for hierarchical stacked graphs." Proceedings of the 2012 ACM international conference on Interactive tabletops and surfaces. ACM, 2012.*

Ji Soo Yi, Rachel Melton, John Stasko, Julie A. Jacko, Dust & Magnet: multivariate information visualization using a magnet metaphor; Information Visualization (2005) 1-18; www.palgrave-journals.com/ivs.

Heim, Philipp et al., SemLens: Visual Analysis of Semantic Data with Scatter Plots and Semantic Lenses; Proceedings of the 7th International Conference on Semantic Systems (I-Semantics 2011), New York, NY, ACM, 2011; pp. 175-178.

* cited by examiner

|  | Forces | Layouts | Mutations | Barriers | Filters | Queries & Overlays |
|---|---|---|---|---|---|---|
| Forces | *Magnets* Points are pulled to a finger | | | | | |
| Layouts | *Force plots* Points are pulled to their place in a chart | *Fixed charts* Points snap to their place on a chart | | | | |
| Mutations | *Group by vector* Group points that are moving similarly | *Group by layout* Group points by their place in a chart | *Groups* Put points into abstract groups | | | |
| Barriers | *Jelly walls* Points need an extra push to pass a wall | *Layout walls* As points pass, put them into a layout | *Collision to data* Points that hit a wall are assigned values | *Walls* Block points from a region of space | | |
| Filters | *Query magnet* Attract points that meet specific criteria | *Detail view* See point details in a layout popup | *Group by filter* Group points based on specific criteria | *Sieves* Walls only permit certain points | *Show/hide* Display points by criteria | |
| Queries & Overlays | *Query fields* Visualize the pull of different forces | *Area details* See details for points that meet criteria | *Group zoom* Zoom in and manipulate points | *Lens* Highlight certain points in a region | *Selective overlay* Highlight/select points by criteria | *Overlays* Color/scale points by data dimensions |

- Forces – Act on points to move, attract, or accelerate
- Layouts – Place points into meaningful locations
- Mutations – Mutate, combine, or change points
- Barriers – Prevent points from occupying a region
- Filters – Selectively include or exclude based on criteria
- Queries – Change the display appearance of points

FIG. 4

METHODS AND SOFTWARE FOR VISUALIZING DATA BY APPLYING PHYSICS-BASED TOOLS TO DATA OBJECTIFICATIONS

RELATED APPLICATION DATA

This application claims the benefit of priority of U.S. Provisional Patent Application Ser. No. 61/995,904, filed on Apr. 24, 2014, and titled "TouchViz: Multitouching multivariate data," which is incorporated by reference herein in its entirety.

STATEMENT REGARDING FEDERALLY SPONSORED RESEARCH OR DEVELOPMENT

This invention was made with government support under IIS0968484 awarded by the National Science Foundation. The government has certain rights in the invention.

FIELD OF THE INVENTION

The present invention generally relates to the field of data visualization. In particular, the present invention is directed to methods and software for visualizing data by applying physics-based tools to data objectifications.

BACKGROUND

Multivariate data, particularly data having more than three attributes, is pervasive not only in engineering, science, and business, but also, thanks to the Internet, in everyday life. A simple example is the consideration of purchasing an automobile. Not only are there large numbers of makes, models, and types of automobiles, but each automobile has its own set of attributes, such as size, horsepower, fuel economy, fuel type. Unless a prospective purchaser has an allegiance to a particular manufacturer and/or model or otherwise is set on purchasing a specific vehicle, the purchaser can be overwhelmed by making a purchasing decision on any desired subset of attributes because of the large number automobiles that can be compared with one another. Various visualization schemes have been developed to assist users in understanding multivariate data in small to moderately sized data sets. However, each of these schemes has one or more limitations, including being limited to specific types of data sets, not being intuitive, and lacking repeatability, among others.

SUMMARY OF THE DISCLOSURE

In one implementation, the present disclosure is directed to a method of enabling a user to visualize a data set on a graphical display of a computing system, wherein the data set contains a plurality of records each having a plurality of attributes common to the plurality of records. The method includes displaying, by the computing system, a physics-based sandbox on the graphical display; objectifying, by the computing system, each of the plurality of records based on an attribute of the plurality of attributes so as to create a corresponding plurality of simulated physical objects; displaying the simulated physical objects in the physics-based sandbox; receiving, by the computing system, a user selection of a physics-based data-manipulation tool, wherein the physics-based data-manipulation tool invokes a physics-based interaction with one or more of the plurality of simulated physical objects, wherein the physics-based interaction is modeled by one or more physics-based modeling algorithms; displaying a graphical representation of the physics-based data-manipulation tool in the physics-based sandbox; determining, by the computing system, which one or more of the plurality of simulated physical objects experiences the physics-based interaction; applying, by the computing system, the one or more physics modeling algorithms to each of the plurality of simulated physical objects determined to experience the physics-based interaction so as to determine at least one updated graphical representation for each of the one or more of the plurality of physical objects experiencing the physics-based interaction; and rendering each of the at least one updated graphical representation in the physics-based sandbox.

In another implementation, the present disclosure is directed to a machine-readable storage medium containing machine-executable instructions for performing a method of enabling a user to visualize a data set on a graphical display of a computing system, wherein the data set contains a plurality of records each having a plurality of attributes common to the plurality of records. The machine-executable instructions includes a first set of machine-executable instructions for displaying, by the computing system, a physics-based sandbox on the graphical display; a second set of machine-executable instructions for objectifying, by the computing system, each of the plurality of records based on an attribute of the plurality of attributes so as to create a corresponding plurality of simulated physical objects; a third set of machine-executable instructions for displaying the simulated physical objects in the physics-based sandbox; a fourth set of machine-executable instructions for receiving, by the computing system, a user selection of a physics-based data-manipulation tool, wherein the physics-based data-manipulation tool invokes a physics-based interaction with one or more of the plurality of simulated physical objects, wherein the physics-based interaction is modeled by one or more physics-based modeling algorithms; a fifth set of machine-executable instructions for displaying a graphical representation of the physics-based data-manipulation tool in the physics-based sandbox; a sixth set of machine-executable instructions for determining, by the computing system, which one or more of the plurality of simulated physical objects experiences the physics-based interaction; a seventh set of machine-executable instructions for applying, by the computing system, the one or more physics modeling algorithms to each of the plurality of simulated physical objects determined to experience the physics-based interaction so as to determine at least one updated graphical representation for each of the one or more of the plurality of physical objects experiencing the physics-based interaction; and an eighth set of machine-executable instructions for rendering each of the at least one updated graphical representation in the physics-based sandbox.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is diagram illustrating exemplary tools and interactions that a designer can provide to a data visualization and/or manipulation system made in accordance with the present invention;

DETAILED DESCRIPTION

In some aspects, the present disclosure is directed to methods and corresponding embodying software for allowing users to visualize and/or manipulate data, for example, multivariate data and/or graph data, on a graphical display of a computing system intuitively by objectifying the data into simulated physical objects and allowing the user to apply one or more physics-based primitives to the simulated physical objects. The physics-based primitives can be implemented in any of a number of contexts, and each can be used independently of others of the physics-based primitives or combined with another of the physics-based primitives to provide another physics-based data-manipulation tool or type of interaction. In some embodiments, the physics-based primitives are used to create simulated physical tools that a user can selectively implement and manipulate, such as using touchscreen gesturing or other human-machine input technique(s), and overlay with one or more other simulated physical tools. Such simulated physical tools are designed and configured to interact with the simulated physical objects (i.e., the objective data) to cause changes to the simulated physical objects, such as by changing their appearance (e.g., using an optical filter lens tool), by moving them from their charted locations on a chart (e.g., using a simulated sieve or physical barrier tool that filters certain simulated physical objects based on attribute value), changing their values or datatypes (e.g., by applying a brush or lassoing them into a group), and by preventing them from moving to their charted locations on a chart (e.g., using a physical barrier that blocks certain simulated physical objects based on attribute value), among others. In addition or alternatively to such simulated physical tools, some embodiments include applying one or more physics-based phenomena, such as simulated gravity, Newtonian motion and interaction, to objectified data, i.e., simulated physical objects, in generating charts, such as histograms and scattergrams, among others. Examples of each of the foregoing and other features, aspects, and embodiments are described below in detail.

Figure 1:
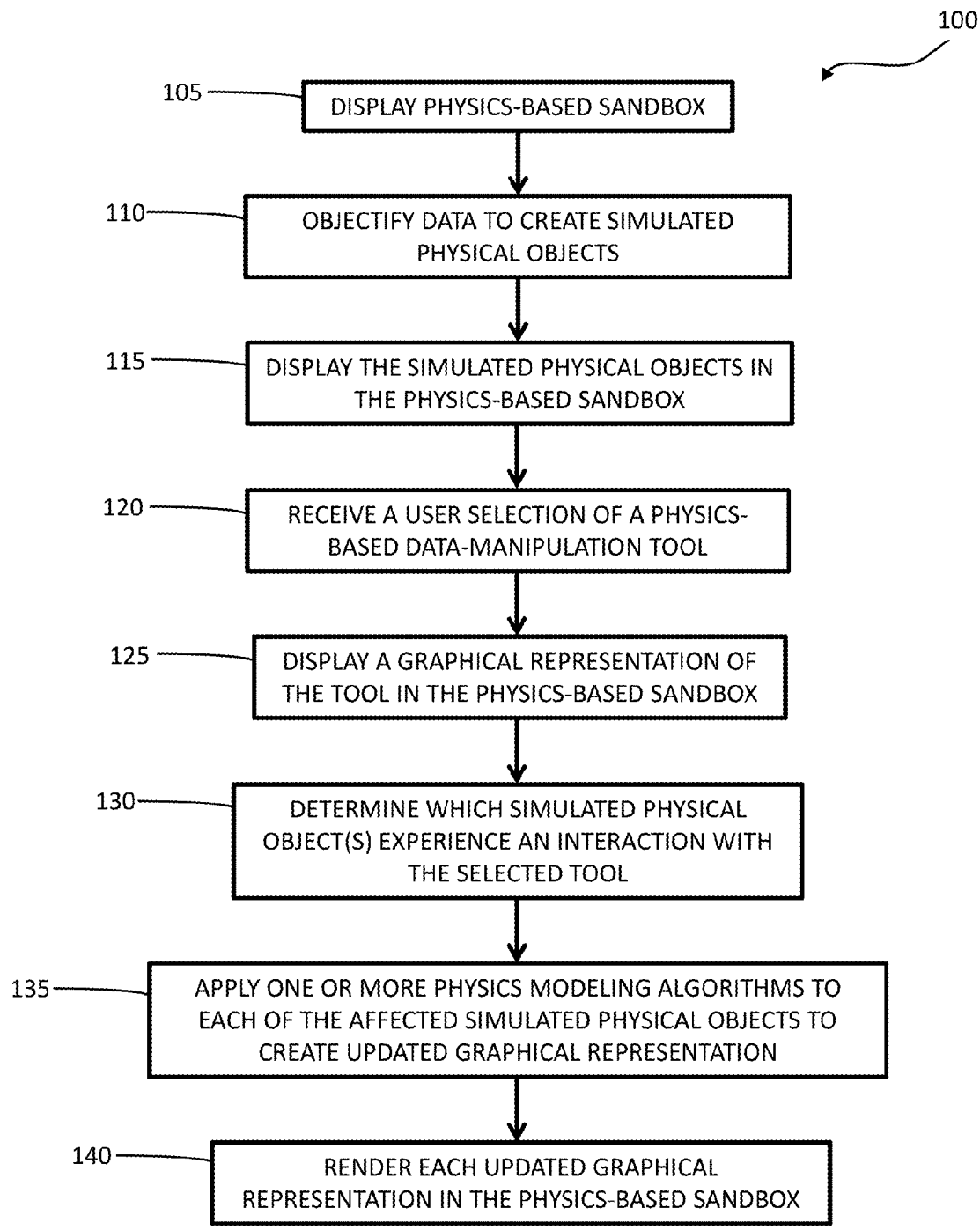
FIG. 1 is a flow diagram illustrating a method of allowing a user to visualize and/or manipulate data using objectifications of the data presented on a graphical display.
Figure 2:
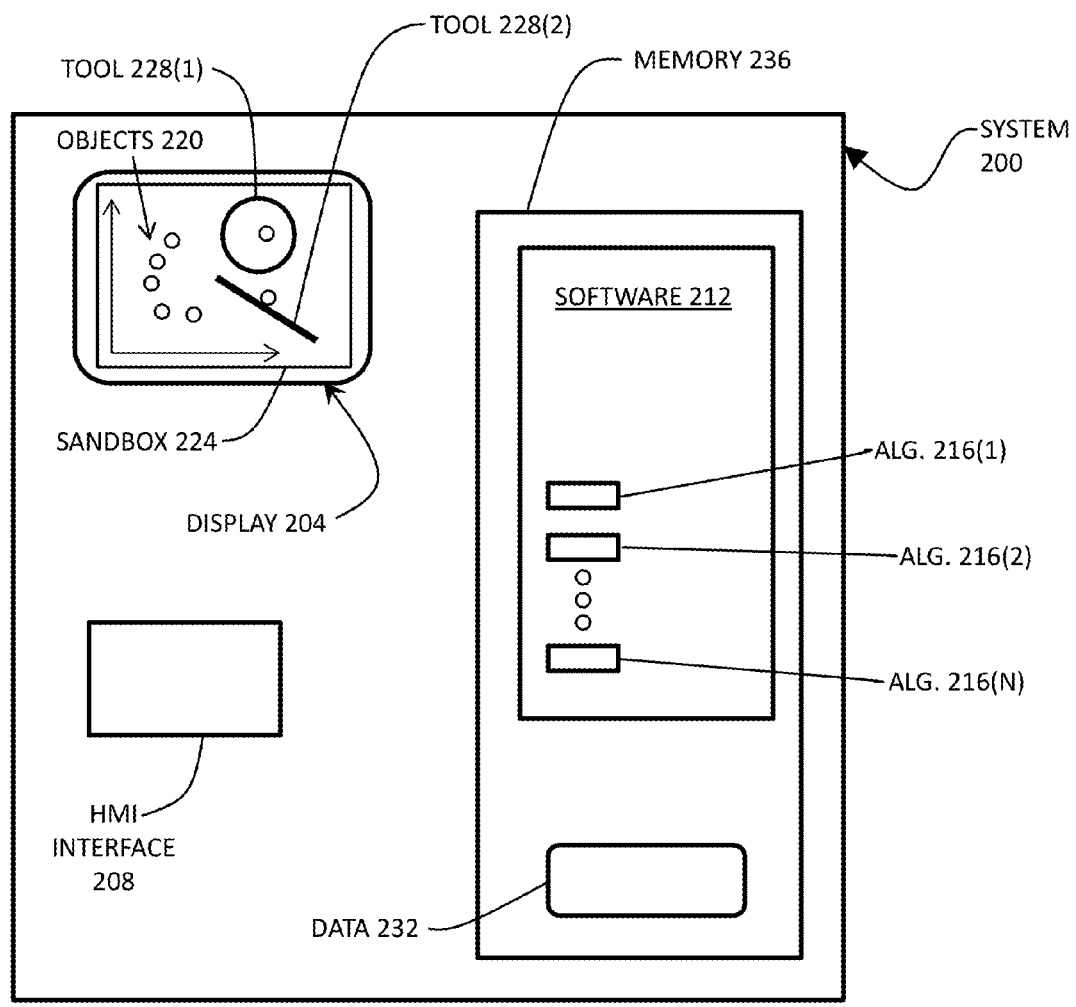
FIG. 2 is a high-layer block diagram of a computing system and corresponding software that may be used to implement aspects of the present invention, such as the methods of FIGS. 1 and 3.

Referring now to the drawings, FIG. 1 illustrates an exemplary method 100 of allowing a user to visualize and/or manipulate data using any one or more of a variety of physics-based data-manipulation tools. However, before describing method 100, an overview of various aspects, features, and functionalities of the present invention are first described in the context of an exemplary computing system 200, which is illustrated in FIG. 2. It is noted that FIG. 18, described below, illustrates exemplary hardware aspects of a computing system, such as computing system of FIG. 2, that can be programmed in accordance with the present invention. In contrast to FIG. 18, FIG. 2 abstracts such a computing system to functionality and features underlying various aspects of the present invention. As those skilled in the art will readily appreciate from reading this entire disclosure, a computing system used for embodying the physics-based visualization and/or manipulation schemes of the present disclosure, such as computing system 200 of FIG. 2, may be any suitable computing system composed of any one or more computing devices, such as one or more tablet computers, smartphones, laptop computers, desktop computers, wearable computers (e.g., smartwatches), Internet appliances, webservers, computing systems onboard vehicles (such as systems that operate on onboard navigation systems), or any other computing devices capable of providing functionality described herein. It is noted that many deployments will require two or more devices, such as an Internet-based deployment in which the visualization and/or data-manipulation software and multivariate data resides on one or more webservers and a user is using a web-browser running on another device, for example, tablet computer, smartphone, laptop computer, etc., to view the visualizations and effect the interactions with such software. In other deployments, the requisite software may run locally on a single device, such as a tablet computer, smartphone, laptop computer, etc., perhaps with the multivariate data stored on that device. Of course, the multivariate data in such a scenario may be retrieved from any suitable source by the computing device, such as a webserver in an Internet context. Fundamentally, there are no limitations on the type of deployment and number of computing and other devices that may be utilized to effect a suitable data visualization and/or manipulation session.

In addition, the display upon which the visualizations are displayed, such as graphical display 204 of computing system 200 of FIG. 2, may be any suitable display, including an electronic display (e.g., LED-based displays), a plasma display, a cathode ray tube display, a touch display, a screen-based projection display, a free-space real image projection display, and a volumetric display, among others. Fundamentally, there is no limitation on the technology for executing a graphical display, as long as it is capable of providing the requisite visualization. Relatedly, user inputs for interacting with the displayed visualizations can be made via any suitable human-machine-interaction (HMI) interface, such as HMI interface 208 of FIG. 2, including touch screen interfaces (capacitive-type, infrared-grid-type and otherwise), computer mice, keyboards, 3D gesture-reading devices, tablet digitizers, among others, and any suitable combination thereof. It is noted that while gesturing can be an intuitive mode for humans to interact with the computing system, gesturing can be supplemented or replaced with other input modes.

In some embodiments, visualization and/or data manipulation methods and embodying software made in accordance with the present invention, such as visualization and/or data manipulation software 212 of FIG. 2, can harness 1) the physical, embodied nature of a tablet computer or other computing systems utilizing touch and/or gesture user input modes, and 2) the physics-based modeling algorithms, such as physics-based modeling algorithms 216(1) to 216(N), to allow users to interactively explore data rather than see a static-composed visualization. In aspects of the present invention, data are represented as simulated physical objects, such as simulated physical objects 220, that a user can manipulate, for example, through touches, tilts, and/or finger gestures, among many other HMI. Methods and software of the present disclosure provide an open "physics-based sandbox" for user interaction, such as physics-based sandbox 224, supplying an array of simulated force-based and optics-based (i.e., physics-based) tools, such as physics-based tools 228(1) and 228(2), for structuring, manipulating, and viewing data that is effectively made physical via the physical modeling on the computing system. These tools promote curiosity, play, and exploration, leading users to trends and actionable findings encoded in data. By mimicking real-world forces, gravity, momentum, and/or optical filtering, among other physics-based phenomena, embodiments of the present invention allow users to explore multiple dimensions of multivariate data at once, for example, through multitouch interactions. These and other benefits of various aspects of the present invention are described throughout this disclosure.

As described below and illustrated with various examples below, each physics-based data-manipulation tool utilizes one or more physics-based modeling algorithms that each mimic a physical phenomenon that humans are familiar with from everyday experiences, such as electromagnetic attraction and repulsion, gravity, optical filtering, and Newtonian mechanics (expressed, e.g., in movement, collisions between objects, mechanical sieve-style filtering,), among others. Examples of physics-based data-manipulation tools of the present disclosure that utilize such phenomena and corresponding computational algorithms include, but are not limited to, physics-based charting tools and simulated physical tools, such as optical lens filters, physical barrier filters (e.g., sieves), and electromagnetic attraction-repulsion tools. As will become apparent from reading this entire disclosure, allowing a user to use physics-based data-manipulation tools can provide the user with not only with easy-to-use and intuitive tools but can also permit the user to comprehend and assimilate the data in datasets relatively quickly and efficiently, thereby allowing the user to make better and/or quicker decisions.

As noted above, method 100 and other methods disclosed herein operate on data, such as data 232 in hardware memory 236 onboard computing system 200. As those skilled in the art will understand, data 232 may be any suitable type of data, such as multivariate data (including time-series data and textual data, among others) and graph data, i.e., data composed of nodes and edges. For the sake of convenience, as used herein and in the appended claims, multivariate data may be considered to be arranged in a tabular form composed of rows and columns, with the columns corresponding to multiple attributes and the rows corresponding to multiple records. For example, for the automobile-buying example mentioned in the Background section above, exemplary attributes of the columns include make, model, type, price, horsepower, curb weight, acceleration, fuel type, fuel economy, number of cylinders, etc., and each record, i.e., row, corresponds to a particular vehicle, with corresponding values of the attributes for that vehicle populating the attribute fields of that record. While this tabular data structure is used for convenience of data manipulation for the visualization algorithms, those skilled in the art will understand that the data may actually be stored in hardware memory in another manner, such as in a comma-separate data file, relational database, or a hierarchical data structure, among others.

Also for the sake of convenience of explanation and as noted above, visualizations are presented on a graphical display of a computing system via a physics-based sandbox. As used herein and in the appended claims, the term "physics-based sandbox" uses a convenient physical analog, a children's play sandbox, for the simulated environment of the visualization because it connotes the features of a bounded region in which visualizations and physics-based phenomena are presented. Like a child's sandbox, alterations to the visualizations (corresponding to markings in the sand) in the physics-based sandbox can have persistence, i.e., remain visible until the user wipes them away or otherwise removes them.

Before describing exemplary method 100 and although each of the physics-based data-manipulation tools mentioned above is exemplified below, each of these physics-based data-manipulation tools is first described to give the reader better context for understanding aspects of the present invention. A physics-based charting tool is a graphical tool that displays the relevant axis(es) of a selected chart (e.g., a histogram, scattergram, etc.) in the physics-based sandbox and utilizes one or more physics-based phenomena to populate the chart with simulated physical objects that represent some or all of the records of the multivariate dataset at issue or some or all of the nodes of the graph dataset at issue. As used herein and in the appended claims, the term "chart" shall include not only multivariate data charts but also graphs, i.e., network charts. In one example, the physics-based phenomenon used to populate the chart is electromagnetic attraction, implemented using an electromagnetic attraction algorithm based on real-world physics that attracts the simulated physical objects from their starting locations, which are typically remote from the charted locations of those simulated physical objects, to their charted locations, which are based on the corresponding respective values of the attribute(s) of the one or more chart axes in the case of multivariate data or their relative locations in a network graph in the case of graph data. The electromagnetic attraction algorithm, like all of the physics-based algorithms disclosed herein, may work in conjunction with graphical rendering algorithms that effectively display the resulting movement of the simulated physical objects rendered in the physics-based sandbox on the graphical display as continuous movement as perceived by the user to provide realism to the user's experience. In some embodiments, the electromagnetic attraction algorithm applies attraction forces that diminish with increasing distance between any particular simulated physical object and its corresponding charted location. In some embodiments, attraction may be augmented with other movement-simulation algorithms, such as overshoot and damping algorithms that allow, respectively, each simulated data object to overshoot the final charted location one or more times and then settle at the final charted location with smaller and smaller overshoot oscillations. Designers may additionally or alternatively use one or more other movement simulation algorithms to suit a particular design. For graph data, electromagnetic attraction forces are typically complemented by electromagnetic repulsive forces to prevent simulated physical objects from clustering together.

It is noted that the initial locations of the simulated physical objects, i.e., data-points, may be any set of suitable locations. For example, the simulated physical objects may initially be distributed randomly within the physics-based sandbox, may initially be clustered with one another in a region of the physics-based sandbox, or may initially be positioned outside the physics-based sandbox, among other possibilities. As another example, in some embodiments a user may change one or more aspects of each chart axis after the data visualization software has already rendered a chart in the physics-based sandbox. As an example in the context of a histogram, the user may change the attribute assigned to the histogram axis from a first attribute to a second attribute. After the user has selected and/or confirmed the selection of a different attribute, the data visualization software re-labels the axis and attracts the simulated physical objects from their charted locations for the first attribute to their new charted locations for the second attribute. As a simple example, if the initial histogram is based on automobile type (e.g., sedan, coupe, hatchback, etc.) and the user selects the axis attribute to be the manufacturers, after the selection the data visualization software changes the type labels on the axis to manufacturer labels and attracts the simulated physical objects from their current locations on the type histogram to the new locations on the manufacturer histogram. Similar actions can be applied to other types of charts, such as scattergrams, wherein the user can change the attributes of both axes individually or together before the data visualization re-labels the axis(es), re-plots the simulated physical objects, and executes an attraction algorithm.

In some embodiments, a user is permitted to change the scale of a numerical chart axis or one or more portions thereof. In a touchscreen example, the user may use two fingers positioned over the displayed axis to stretch (by moving the fingers away from one another) or compress (by moving the fingers toward one another) the portion of the axis between the touchpoints of the user's fingers. This changes the physical scaling of that portion of the axis, such that the charted locations of any simulated physical objects within that portion change accordingly. In such an embodiment, the data visualization software may move the affected simulated physical objects in any of a variety of ways. For example, the data visualization software may move the simulated physical objects in realtime as the user changes the scale. As another example, the data visualization software may move the affected simulated physical objects only after the user disengages their fingers from the touchscreen, for example using an attraction algorithm, such as any of the attraction algorithms noted above.

It is noted that, depending on the initial locations and newly charted locations of the simulated physical objects, one or more other physics-based phenomena may be modeled to render the movements displayed on the graphical display. For example, if various ones of simulated physical objects collide with one another on their attraction trajectories between their initial locations and newly charted locations, suitable physical-object-interaction algorithms may be used to drive the renderings to simulate real-world collisions between physical objects. As those skilled in the art will readily understand, depending on the shapes of the simulated physical objects (circular, spherical, rectangular, block, etc.) the physical-object-interaction algorithms can become quite complex. However, various realtime physics engines, such as the CHIPMUNK2D™ realtime 2-dimensional (2D) solid-body physics engine available from chipmunk-physics.net and COCOS2D™ realtime 2D physics engine available from python.cocos2d.org, are widely available and can be adapted for use in embodiments of the present invention. Other suitable 2D physics engines are available. Three-dimensional (3D) physics engines are available or can be created by those skilled in the art without undue experimentation.

A simulated physical tool is a graphical tool that utilizes one or more-physics-based phenomena to physically interact with and/or visually alter ones of the simulated physical objects in the physic-based sandbox. Examples of simulated physical tools include filters that can be of a physical interaction type or a visually altering type (e.g., optical filtering lenses). One example of a physical interaction type of filter is a semipermeable physical barrier that is designed and configured to allow and block passage of ones of the simulated physical objects based on one or more filter parameters that correspond to one or more attributes of variables (in a multivariate dataset) nodes or edges (in a graph dataset). As those skilled in the art will readily appreciate, each filter parameter may be expressed in terms of one or more operators and one or more attribute values. Operators include, but are not limited to, greater-than, less-than, greater-than-or-equal-to, less-than-or-equal-to, equal-to, not-equal-to, not, or, and, exclusive-or, etc., and can be applied to numerical attribute values, nominative values, and/or computed values (e.g., median, degree, centrality). The interactions between the simulated physical objects and a physical barrier, such as passing through the barrier and impacting upon and being blocked by the barrier, may be determined using one or more suitable physical interaction algorithms, which can work in conjunction with suitable realtime rendering algorithms to render the interactions in realtime in the physics-based sandbox displayed on the graphical display.

One example of a visually altering type of filter is an optical filtering lens that is designed and configured to change the visual character of ones of the simulated physical objects to which the optical filtering lens is applied based on one or more filter parameters that correspond to one or more attributes of the multivariate dataset. As with filter parameters for a semipermeable physical barrier, each filter parameter for an optical filtering lens may be expressed in terms of one or more operators and one or more attribute values. Operators include, but are not limited to, greater-than, less-than, greater-than-or-equal-to, less-than-or-equal-to, equal-to, not-equal-to, not, or, and, exclusive-or, etc., and can be applied to numerical attribute values and/or nominative values. The change in visual character of ones of the physical objects may be determined by whether or not the corresponding value(s) of the relevant attribute(s) of the filter parameter(s) are met or not. The change in physical character is analogous to a physical optical filter that filters based on wavelength, intensity, and/or other characteristics of light.

In some embodiments, a simulated physics tool of the present invention, such as a semipermeable physical barrier tool or an optical filter lens tool can be augmented to provide information about one or more characteristics of the data relevant to the tool, including but not limited to descriptive statistics (such as mean, median, standard deviation, sum, count, quartiles), analytics (such as statistical tests including regression, chi-square, factor analysis, t-test), and details (such as pictures, videos, and annotations). The information provided pertains only to the data underlying the simulated physical object(s) filtered in or out by the corresponding tool. For example, if the tool is a semipermeable physical barrier tool, the information pertains only to the data underlying the simulated physical objects still remaining inside the physical barrier, and if the tool is an optical filter lens tool, the information pertains only to the data underlying the simulated physical objects highlighted by the lens. Those skilled in the art will readily appreciate how to apply the relevant software algorithms needed to perform the necessary calculation and/or informational display. An example of augmenting a simulated physical tool with additional information is described below in the context of FIG. 9.

Other examples of simulated physical tools include electromagnetic attraction-repulsion tools that each attract and/or repel simulated data objects based on one or more attraction-repulsion parameters and the corresponding values for the relevant attribute(s) of the multivariate data. Each electromagnet attraction-repulsion tool may operate in a manner similar to the electromagnet attraction-repulsion tool described above relative to plotting simulated physical objects on a chart, except that instead of the attraction and/or repulsion being based on charted locations, the attraction and/or repulsion may be based on a use selected location and one or more user-selected parameters, as well as which force, i.e., attraction or repulsion, to apply to which parameter. In one example in the context of a touch-screen-based graphical display, a user may designate the location of the attraction-repulsion tool by touching, and optionally holding, a finger on the graphical display at a location in the physics-based sandbox, for example after setting the options, such as attraction-repulsion parameter(s) and force(s), for the tool. Yet another example of a simulated physical tool is a gravity tool that may utilize accelerometers onboard the computing system or graphical display to apply gravity forces to the simulated physical objects based on the orientation of the graphical display. For example, the computing system may apply such gravitational forces in a direction toward the center of the Earth as if the simulated physical objects were actual physical objects subjected to the Earth's gravitational pull. Those skilled in the art will readily understand how to model gravity for a gravity tool of the present disclosure.

To allow a user to select physics-based data-manipulation tools and/or set tool parameters, the data-visualization software may provide various selectors accessible, for example, via menus, icons, popup windows, and/or any other suitable graphical user interface (GUI) tool(s) known in the art. As mentioned above, touch and/or gesture based use input can provide the user with a highly intuitive experience when interacting with physics-based data-manipulation tools and the simulated physical objectifications of the data themselves. In some embodiments, the user may manipulate the graphical representation of each of the physics-based data-manipulation tools in real time in the physics-based sandbox displayed on the graphical display. For touch-based user input, manipulation may involve the user touching one or more touch points of the graphical representation, such as endpoints of chart axes in a chart tool, endpoints of an open barrier of a physical barrier tool, points of a closed barrier of a physical barrier tool, edge points of a lens of an optical filter lens tool, among many others. Regarding simulated physical tools, such as physical barrier filters and optical lens filters, the data visualization software typically continues to display the most-recent configuration and position of each tool within the physics-based sandbox until the user controls the software to remove that tool. This is useful in that it allows the user to implement any number and type of simulated physical tools sequentially while the previously implemented tool(s) remain. In this manner, the user can filter the simulated physical objects and underlying data incrementally based on desired filtering parameters to see how the results change from one filter to another.

With that general introduction and referring again to FIG. 1, method 100 may begin at step 105 with a computing system, via suitable data visualization and/or visualization software, displaying a physics-based sandbox on a graphical display. As noted above, the graphical display can be any type of graphical display, including but not limited to electronic 2D and 3D displays and projected 2D and 3D displays. At step 110, the computing system objectifies the data in the dataset by creating a simulated physical object for each record or node to create a plurality of simulated physical objects. In the automobile-buying example above, this results in a simulated physical object being created for each vehicle. It is noted that each simulated physical object may be any suitable graphical object, such as a 2D shape for 2D visualizations or a 3D shape for 3D visualizations. Examples of simple 2D shapes include circles (filled and/or unfilled), annuluses, and rectangles, among many others, and examples of simple 3D shapes include spheres, toroids, and blocks, among many others. In addition to virtually limitless 2D and 3D shapes, in some embodiments the shapes of the simulated physical objects may be customized to convey one or more attributes of the subject matter of the records. For example, in the automobile-buying example, the simulated physical objects may be shaped like the type of vehicles, with the graphical object for a sedan shaped like a sedan, the graphical object for a wagon shaped like a wagon, the graphical object for a pickup truck being shaped like a pickup truck, etc. Fundamentally, there is no limitation on the type of the objectification used for any particular visualization.

At step 115, the computing system displays the simulated physical objects in the physics-based sandbox on the graphical display. At step 120, the computing system receives a user selection of a physics-based data-manipulation tool. As alluded to above, a physics-based data-manipulation tool is a simulated tool that invokes a physics-based interaction with one or more of the plurality of simulated physical objects, with the physics-based interaction being modeled by one or more physics-based modeling algorithms. As described above, examples of physics-based interactions include, but are not limited to, electromagnetic attraction, movement overshoot, movement damping, blocking, collision, physical filtering, and optical filtering, to name some. As also described above, examples of physics-based data-manipulation tools include but are not limited to physics-based charting tools and associated features, such as axis reconfiguration and realtime dynamic scaling, and simulated physics-based tools, such as physical and optical filter tools and attraction-repulsion tools, among others.

At step 125, the computing system displays a graphical representation of the physics-based data-manipulation tool selected by the user at step 120 in the physics-based sandbox on the graphical display. The graphical representation may be any suitable graphical representation. For example, if the selected physics-based data-manipulation tool is a physics-based charting tool, the graphical representation may be a chart containing the pertinent number of axes, along with suitable axis labels. As another example, if the selected physics-based data-manipulation tool is a simulated filter lens, the graphical representation may simulate an optical lens and/or a lens holder, such as a holder typical of a handheld common magnifying glass, among many others. As a further example, if the selected physics-based data-manipulation tool is a simulated physical barrier, the graphical representation may be a line or other graphical element representing a barrier-type structure. Those skilled in the art will readily appreciate how various physics-based data-manipulation tools can be represented, for example, in manners that a user can readily identify the tool type and/or tool function.

At step 130, the computing system determines which one or more of the plurality of simulated physical objects experience the physics-based interaction. Typically, this determination is made, at least in part, using the relevant attribute(s) for the selected physics-based data-manipulation tool. For example, if the selected physics-based data-manipulation tool is a physics-based charting tool, the computing system determines the affected simulated physical object(s) by the attribute(s) assigned to the chart axis(es) and the corresponding value(s) for that (those) attribute(s) for the various simulated physical objects (data records). As another example, if the selected physics-based data-manipulation tool is a simulated physical tool having one or more functional parameters based on one or more attributes, the computing system determines the affected simulated physical object(s) by the relevant functional parameter(s).

At step 135, the computing system applies the one or more physics modeling algorithms to each of the plurality of simulated physical objects determined to experience the physics-based interaction at step 130 so as to determine at least one updated graphical representation for each of the one or more of the plurality of simulated physical objects experiencing the physics-based interaction. As one example, if the selected physics-based data-manipulation tool is a physics-based charting tool and the corresponding physics modeling algorithm is an electromagnetic attraction algorithm, then the computing system applies that algorithm to each of the affected simulated physical objects to attract that object to its charted location. In another example, if the selected physics-based data-manipulation tool is an optical filter lens and the physics modeling algorithm alters the visual characteristics of the affected simulated physical object(s), then the computing system applies that algorithm to each of the affected simulated physical objects to change the visual appearance of that object. As a further example, if the selected physics-based data-manipulation tool is a physical barrier and the physics modeling algorithms controllably blocks and passes affected simulated physical objects and controls movements of the simulated physical objects, then the computing system applies those algorithms to each of the affected simulated physical objects to control its response and/or motion. Of course, these physics modeling algorithms are merely examples, and those skilled in the art will readily be able to implement other physics modelling algorithms in a data manipulation method using the present disclosure as a guide.

At step 140, the computing system renders each of the at least one updated graphical representation in the physics-based sandbox on the graphical display for viewing by the user. This can be viewed as either applying to a single update as the computing system continually updates the graphical display to simulate movement of the one or more simulated physical objects or as applying to a sequence of updates that render movement of the one or more simulated physical objects in realtime.

Figure 3:
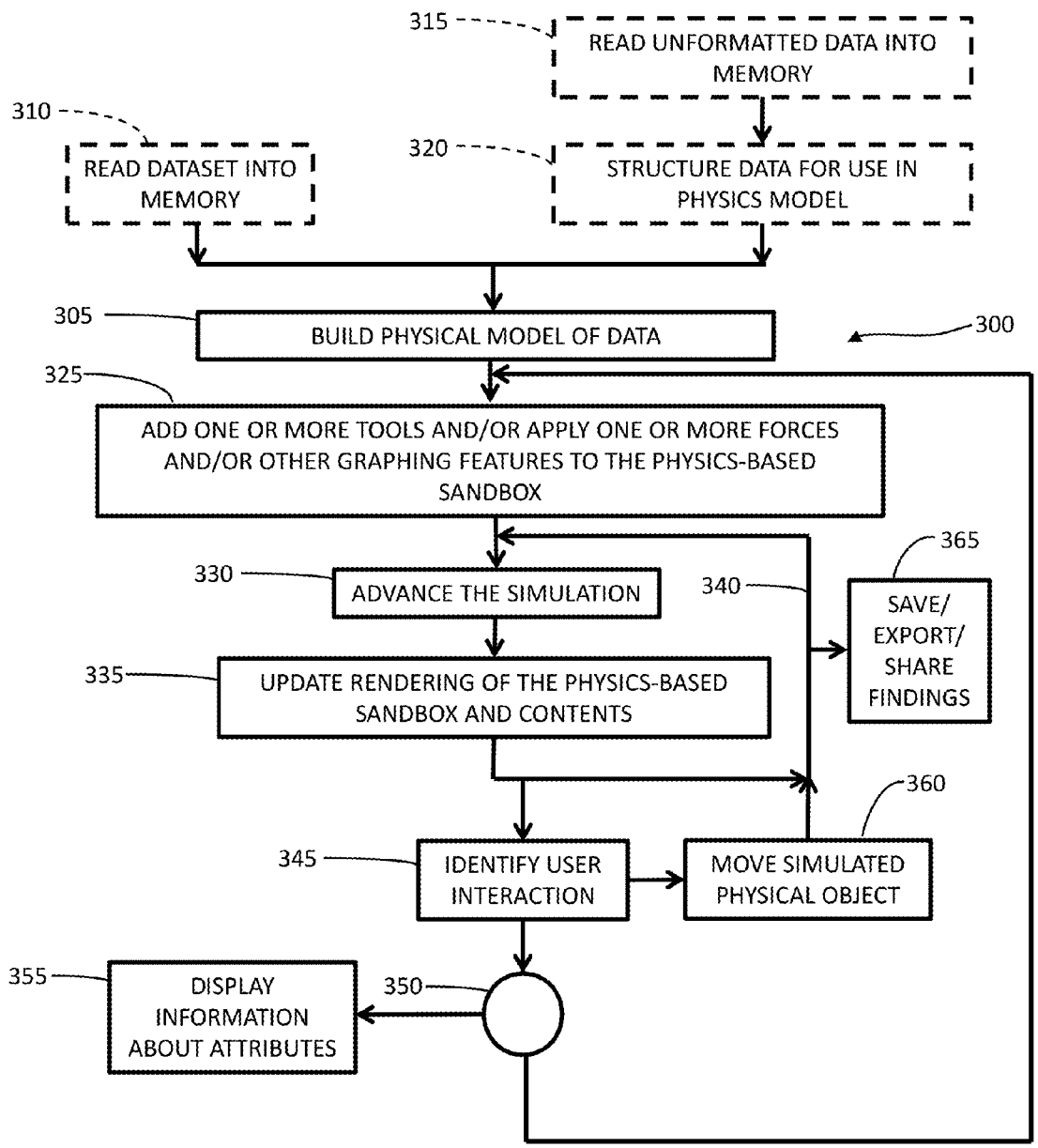
FIG. 3 is a flow diagram of another method of allowing a user to visualize and manipulate data according to the present invention.

As those skilled in the art will readily appreciate, aspects of the present invention can be described and modeled in a variety of ways. In view of this, FIG. 3 illustrates another exemplary method 300 of providing a physics-based visualization of a set of data on a graphical display of a computing system. Referring now to method 300, at step 305, the computing system builds a physical model of the data. For example, at step 305 the computing system may construct the simulated physical environment for the visualization, which as noted above is referred to herein and the appended claims as a "physics-based sandbox." Another aspect of building the physics model at step 305 is objectifying the data by constructing a simulated physical object for each record (row) of multivariate data or node of graph (i.e., network) data. Examples of this objectification and exemplary simulated physical objects are presented above. Building the physical model at step 305 may also include cueing the physical model to construct the starting environment, which may include rendering the simulated physical objects in the physics-based sandbox on the graphical display with or without the presence of an initial chart.

In the building of a physical model at step 305, multivariate data may be conveniently visualized as a dataset in tabular form, with rows of the table corresponding to data records (and modeled simulated physical objects) and columns of the table corresponding to a plurality of attributes, with fields of the crossing rows and columns being populated with corresponding respective values (numerical, nominative, etc.). It is noted that the dataset may be a dataset previously modeled at step 305. Consequently, at optional step 310, the computing system may read the dataset into a memory of the computing system. Substeps that the computing system may perform at step 310 include, but are not limited to, unzipping previously saved data filed containing the dataset, reading stored structured data of the dataset, and reading metadata for configuring the data visualization software, such as for current physics-based data-manipulation tools used and locations for simulated physical objects, among other things.

Alternatively to utilizing a previously formatted data file, at optional step 315 the computing system may read an unformatted data file into its memory. Substeps that the computing system may perform at step 315 include but are not limited to parsing the data file and generating a two-dimensional array of rows and columns and storing the parsed data in memory location. At optional step 320, the computing system may structure the data for use in the physics model. For example, substeps that the computing system may perform at step 320 may include reading data headers, identifying missing values, mapping rows of data to headers using a dictionary, reviewing each column to determine data type, and building a directory of data information such as range, deviation, etc., among other things. This structuring of the data assists the computing system to work efficiently and effectively during modeling and rendering data manipulations in the physics-based sandbox for display to a user.

At step 325, the computing system may add one or more physics-based data-manipulation tools and/or apply one or more physics-based forces and/or other charting features to the physics-based sandbox. The computing system may make such addition(s) as part of an initialization process or in response to a user selection of one or more physics-based data-manipulation tools. Examples of items that the computing system may add to the physics-based sandbox at step 325 include, but are not limited to, a gravity tool based on device orientation, charts that attract simulated physical objects (i.e., data records) to particular locations (such as plotted points), physical barriers that sift points based on their attribute values, optical lenses that highlight certain simulated physical objects base on their attribute values, appearance tools that provide various ones of the simulated physical objects with certain appearances (e.g., size, color, shape, etc.) based on their attribute values, and meta-groups of data records represented as a graphical object (such as a pie chart), among others.

At step 330, the computing system advances the simulation to update the rendering of the physics-based sandbox and its contents (see step 335) based on any changes that the computing system determines to have occurred. Such changes include updates in positions and/or appearances of the simulated physical object, updates in positions and/or appearances of physics-based data-manipulation tools, among others, as a result of calculations by one or more pertinent physics modeling algorithms and/or one or more user inputs. It is noted that the term "simulation" does not necessarily mean that the rendered motions, interactions, reactions, etc., of the simulated physical objects exactly mimic real-world counterparts, but rather these aspects are modeled using general physics principles. For example, the physics modeling algorithms may change, distort, and or not utilize certain real-world rendered motions, interactions, and/or reactions, but still provide a user with an intuitive interactive experience.

Substeps that the computing system may perform at step 330 may include any one or more of the following substeps. The computing system may determine how much time has passed since the last simulation "tick," i.e., update. It is noted that the time period of the tick is typically selected so that any motion the computing system renders on the graphical display allows the user to perceive the motion as continuous. In addition to displaying changes due to motion (applied forces, such as gravity, attraction, etc.), selection(s) of any user-selectable tools, and any other visual changes to the physics-based sandbox and its contents, the computing system may perform other substeps when advancing the simulation at step 330, such as checking to see if the simulated physical objects collide with anything within the physics-based sandbox, such as other simulated physical objects and any physics-based data-manipulation tools, such as physical-barrier filters and chart axes, among others. The computing system can use suitable physics-modeling algorithms to handle such collisions. Also, for any simulated physical object colliding with a barrier-type filter, the computing system may apply any rules applicable to the collision, such as permitting the simulated physical object to pass through the filter. The computing system may also use one or more rules and/or formulas to resolve collisions and/or prevent overlap, among other things.

As alluded to above, at step 335 the computing system updates the visualization, i.e., the displayed physics-based sandbox and its contents, based on the advancing determined at step 330. Examples of substeps that the computing system may perform at step 335 may include, for each data record, drawing a simulated physical object in the physics-based sandbox and adjusting the appearance (e.g., changing color, size, etc.) as necessary. Other substeps that the computing system may perform may be to draw the appearance of each of the tools in the physics-based sandbox at the correct location and to query the data records corresponding to the simulated physical objects for the necessary values to build chart grids, scales, and/or labels, etc. Method 300 may include a loop 340 that continually performs steps 330 and 335 to keep the visualization current as time progresses so that the simulations and corresponding time-dependent and other changes occur substantially in realtime.

At step 345, the computing system identifies an interaction, such as one or more touches on a touchscreen-type graphical display of the computing system or other type of input (mouse, keyboard, tablet, etc.) by the user with the physics-based sandbox and determines the user's intent for the interaction. For example, the computing system may determine the user's intent by the location(s) of the touches on the touchscreen-type graphical display and what the computing system is currently displaying on the graphical display at that/those location(s). Depending on the determined intent, the computing system routes, at step 350, the user interaction(s) to the proper handlers, each of which is essentially computer-executable instructions for performing the task(s) corresponding to the determined intent. For example, if the user interaction is a selection and/or manipulation of a particular physics-based data-manipulation tool, then the computing system returns method 300 to step 325. As another example, if the determined interaction is the selection of a certain simulated physical object, then the computing system may invoke a handler that at step 355 displays information about the attributes from the corresponding data record. As a further example, if the determined interaction is the moving of a certain simulated physical object, then the computing system may invoke a handler that at step 360 moves that simulated physical object. Those skilled in the art will readily understand how to implement and execute the various handlers needed for particular interactions such that it is not necessary to provide exhaustive description in order for those skilled in the art to understand how to make and use the present invention to its broadest scope without undue experimentation. It is noted that method 300 may include any one or more of a variety of other steps, such as a step 365 at which the computing systems saves, exports, and/or shares any visualization findings.

A number of physics-based and other visualization tools are presented above, but it should be understood that the presented tools are only exemplary and that those skilled in the art can utilize principles and generative framework disclosed herein to create a variety of other tools. Various physics-based data-manipulation tools of the present disclosure make use of inherent expertise users have based on their experiences in the everyday world in order to help them develop an understanding of data. These techniques are different from traditional visualization approaches, and, in light of users' desire at times for more familiar controls, may work well in concert. However, because they are different from traditional approaches, it is not always easy or intuitive to create new interactions. In this connection, the present inventors have developed the following framework of primitives that skilled artisans can use to create physics-based data-manipulation tools for enabling and/or enhancing interactive multivariate data visualization:

Data are represented as physical points, i.e., as simulated physical objects, that have associated physical properties that correspond to their values in different dimensions.

Data occupy a physics-based sandbox that contains them and allows for interaction. Interactions with the sandbox change the physical arrangement of the data and leave traces of their activities.

A user can employ forces to act on physical points either independently or as a result of their unique data. For instance, a repulsion tool may repulse points with low values in a particular dimension.

The user may use layout tools to force points into strict, meaningful locations, breaking with the physics metaphor when necessary, such as when allowing points to pass over or under others to avoid being trapped.

The user can mutate points, for instance combining multiple points into one group so as to observe more points at once or see larger trends.

The user may place barriers that block or selectively block points based on criteria.

The user can employ filters to selectively include or exclude points to help avoid overload or choose only a small subset of interest.

The user may use queries and overlays to change the appearance or behavior of points on the screen.

These primitives can work in a variety of contexts and situations. For example, they can be used in 2D, which may be easier to interact with, or in 3D where there is a richer space of interactions and room for more dimensions. Likewise, they can function using a keyboard, mouse, and/or multi-touch user interactions, among others.

Furthermore, these primitives could be combined to generate a much richer set of physics-based data-manipulation tools. Mixing these different techniques together can provoke new ways to augment data visualizations with physics. For example, FIG. 4 provides some examples of different tools and interactions that can come out of a combinatorial brainstorming on these primitives. For instance, combining a barrier that blocks points with a selective filter could generate a permeable barrier, and combining forces with a scatterplot layout could create a force-based plot that pulls points to their proper location and might work in concert with other barriers and forces. The present inventors found this framework useful for building the specific physics-based interaction methods instantiated to date.

EXAMPLES

With the foregoing exemplary methods, exemplary principles of operation, and exemplary configurations in mind, following are some examples of physical instantiations that the present inventors have implemented. Each of these examples is based on an actual implementation of a multivariate data visualization and manipulation software implemented on an IPAD® tablet computer, available from Apple, Inc., Cupertino, Calif. As those skilled in the art will readily understand, such a tablet and software can be depicted at a high layer by computing system 200 and software 212 of FIG. 2 described above. Of course, the software underlying these examples can readily be adapted to run on other computing systems, as those skilled in the art will readily understand. For the sake of convenience, continual reference in the following examples to FIG. 2 and its elements is not made below, as those skilled in the art do not need such elaborate detail to understand the examples and their relation to computing system 200 of FIG. 2, as well as to computing system 1800 of FIG. 18, described below. That said, for clarity, each of the screenshots depicted in FIGS. 5 to 16 can be considered to be taken from a display of the corresponding image on display 204 of FIG. 2 (and also on display 1836 of FIG. 18) within the corresponding physics-based sandbox, i.e., physics-based sandbox 224 of FIG. 2.

Choosing a Car

In this example, a user would like a new car, but does not know which model to buy. There are many on sale, and each car model has a dozen or so different columns of statistics, including weight, fuel economy, and manufacturer. To begin, the user loads a database of car models into a computing system containing data visualization software made in accordance with the present invention.

In this case, the user wants a vehicle that is somewhat powerful but uses little fuel. To help answer questions like this, the data visualization software combines physics-based forces with one or more multivariate charts, such as histograms and scatterplots. Histograms pull simulated physical objects (i.e., data records or points), here represented by circles, to their proper place on a number line axis or categorical division axis. If there are a lot of data points in a particular part of the distribution, the data visualization software in this example is configured to display them as bunched up and them consuming more area. Scatterplots functioned similarly, pulling points based on their values, here, to two orthogonal axes. In initial instantiations, the present inventors had concerns of points blocking one another, leading to data points being located in incorrect locations on the histogram. To help avoid this over-constraint, the present inventors temporarily disabled point collision until the data points settled into the proper locations. While this breaks with real-world physical modeling, it can make the resulting visualization more accurate and produces a satisfying settling effect for the points.

Figure 5:
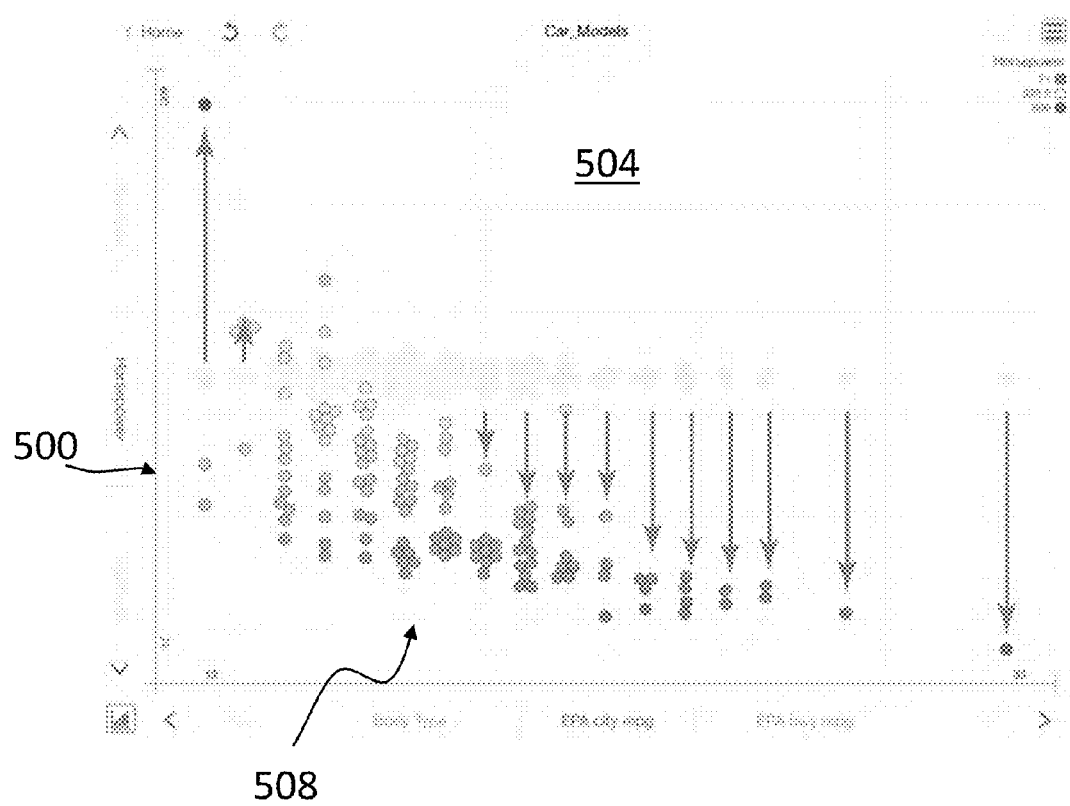
FIG. 5 is a screenshot showing a scattergram of horsepower versus fuel economy containing simulated physical objects, i.e., "data points," representing car models, illustrating ones of the data points being attracted to their charted location in accordance with aspects of the present invention.
Figure 6:
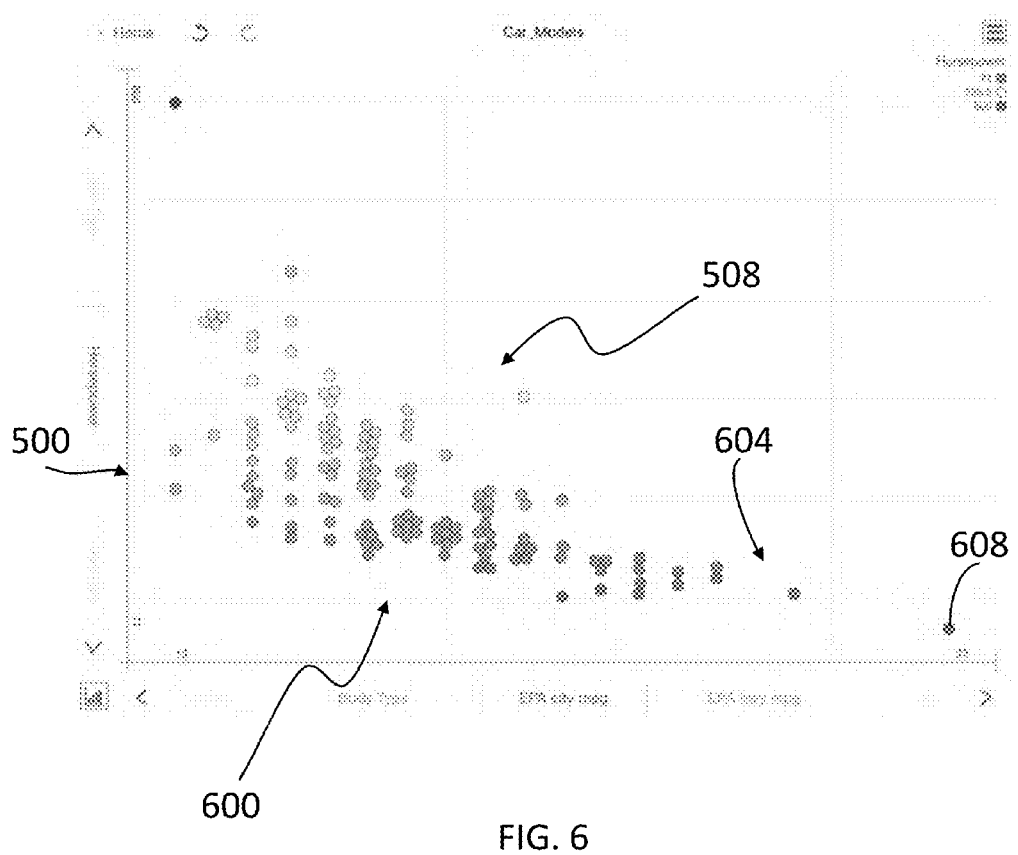
FIG. 6 is a screenshot of the scattergram of FIG. 5 showing the data points located in their charted locations.

In the visualization depicted in FIG. 5, the user placed a scattergram 500 in the physics-based sandbox 504 that graphs horsepower and fuel economy and watched as the data points 508 (individually depicted as circles in FIG. 5) were pulled into the scatterplot. Because the user saw the points moving, the user had an implicit awareness of the action just made, and could attribute the motion of data points 508 to a specific operation. As seen in FIG. 6, the user observed a big clump of cars, i.e., ones of data points 508 in region 600, with moderate horsepower and mileage as expected, and a longer tail 604 of lower horsepower, higher fuel economy cars. Because some of data points 508 collided, the user could interpret their distribution at a glance and could easily spot a super high efficiency outlier 608 in the lower right corner of scattergram 500 because it is so visually distinct.

Figure 7:
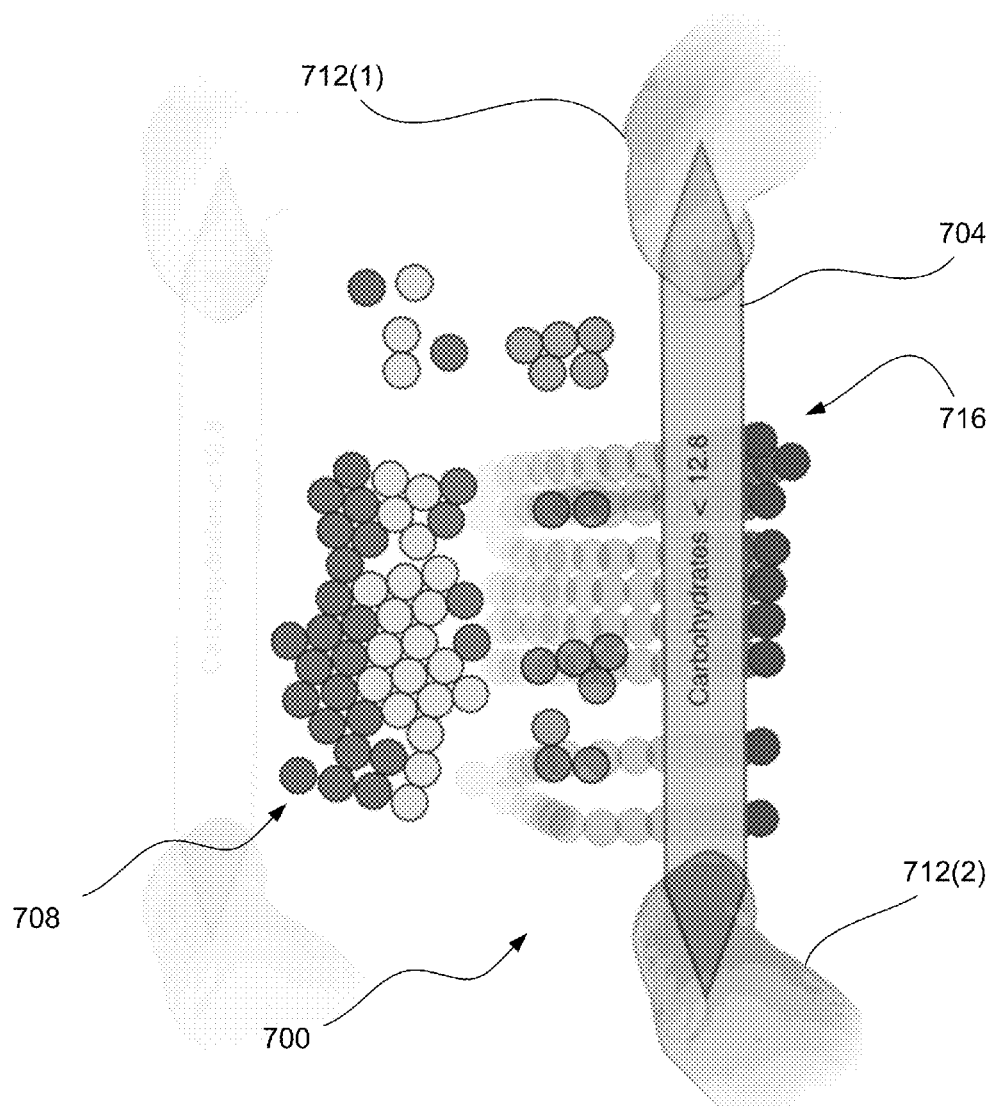
FIG. 7 is a screenshot illustrating a user dragging a semipermeable physical-barrier-type filter across a cluster of data points so as to filter certain data points.

In the present case, the user saw several good candidates in the lower right corner of scattergram 500 (FIG. 6), but wanted to filter hatchbacks cars. For filtering actions, one could imagine simply removing the points from the screen. However, the present inventors wanted to maintain a user's mental model of the data landscape, and simply removing points entirely would break that model, leading to uncertainty. Instead, the present inventors devised and implemented a semipermeable physical-barrier-type filter tool, such as the physical-barrier-type filter tool 700 of FIG. 7, that provide a physical-barrier-type filter 704 that can be dragged over objectified data points 708, for example, using touchscreen display touch and drag techniques with one or more user fingers 712(1) and 712(2), or placed into the physics-based sandbox. (The placing of a physical-barrier-type filter tool is depicted, for example, in FIG. 13 described below.) As illustrated in FIG. 7, with a semipermeable physical-barrier-type filter according to the present invention, such as physical-barrier-type filter 704, ones 716 of objectified data points 708 meeting the blocking parameters build up against the filter, showing just how many of the data points the filter has filtered.

In one embodiment, the present inventors implemented a collision layering system so that data points that should pass through a semipermeable physical-barrier-type filter tool do not get mired in the pile of points that back up against the barrier filter. Each physical-barrier-type filter tool adds a bit to a bitmask, with points permitted to pass the barrier assigned a "1". When any objectified data points (i.e., simulated physical objects) collide, a physics-based modeling algorithm compares their bitmasks. If the bitmasks are the not the same, the modeling algorithm allows the points to pass through one another. So, for example, if there are two physical-barrier-type filter tools present, objectified data points that can pass through the barrier filter tools both form one "layer" of collisions, points that can pass through exclusively one barrier tool from another "layer", and so forth. In this embodiment, this created some edge cases where collision should have happen but did not, such as when barrier tools are nested. This issue can be solved, for example, by incorporating regions of space into the pertinent algorithm.

Figure 8A:
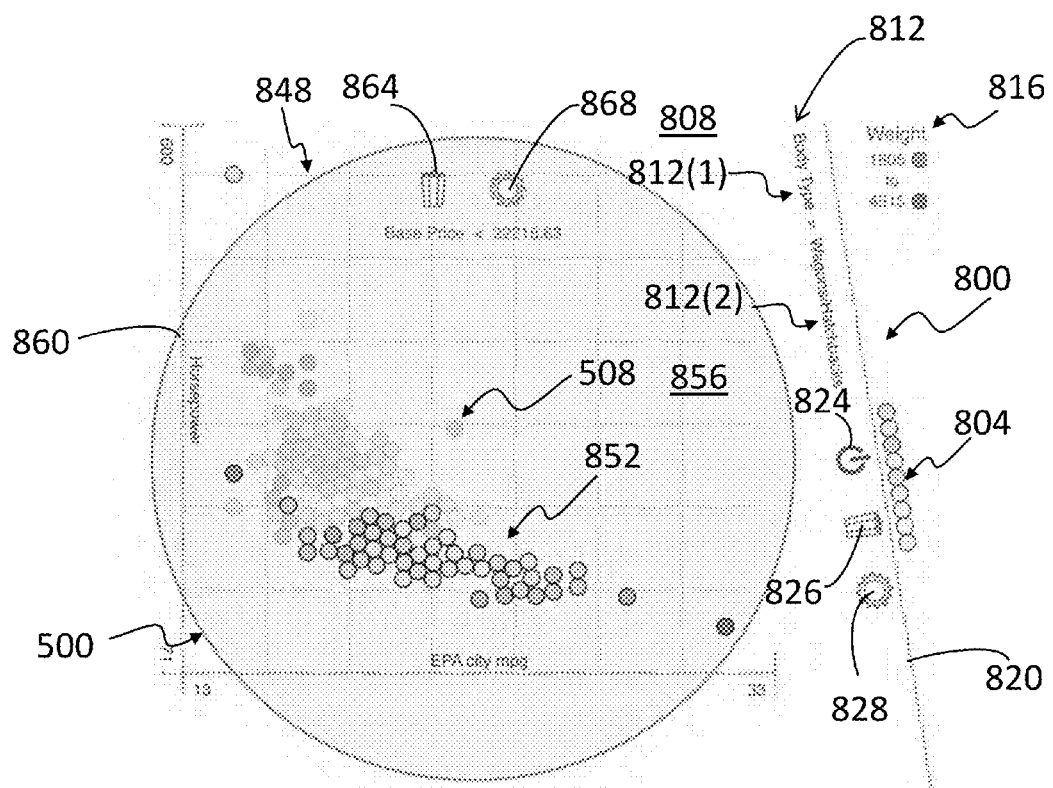
FIG. 8A is a screenshot of the scattergram of FIG. 6 showing 1) a semipermeable physical-barrier-type filter that a user had dragged across the data-points and anchored within the physics-based sandbox and 2) the addition of an optical lens filter tool applied to the data points.
Figure 8B:
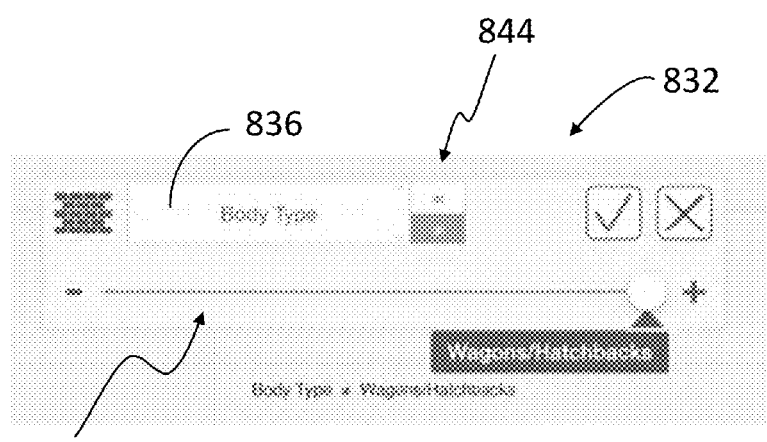
FIG. 8B is a screenshot of a tool-settings graphical user interface for the semipermeable physical-barrier-type filter of FIG. 8A.

Proceeding with the exemplary case and referring to FIG. 8A, the user dragged a physical-barrier-type filter tool 800 across scattergram 500, picking up filtered data points 804 along the way, for example in the manner illustrated in FIG. 6. As illustrated in FIG. 8A, the user finally tapped the touchscreen display 808 to make physical-barrier-type filter tool 800 permanent, separating collected objectified data points, i.e., filtered data points 804 off to the right of the display. As the user dragged physical-barrier-type filter tool 800, they noticed most of filtered data points 804 collected came from the middle of the distribution, leading the user to believe most hatchbacks had moderate horsepower and efficiency. The process of filtering not only moves filtered data points 804 away, but also provided the user with insight into relationships between variables (i.e. attributes) and data values. In this example, physical-barrier-type filter tool 800 includes a label 812 indicating the filter parameter(s), here the attribute 812(1) is "Body Type" and the corresponding value 812(2) is "Wagons/Hatchbacks". Physical-barrier-filter tool 800 also includes a legend 816 that here indicates a weight range (with vehicle weight being one of the attributes of the underlying multivariate data) of the vehicles corresponding to filtered data points 804 filtered by the physical-barrier-filter tool. In this example, physical-barrier-filter tool 800 further includes graphical representation of a physical filter 820 and a number of soft controls, here an on/off switch control 824 that turns the filter tool off and on, a discard (trash) control 826 that allows the user to delete the filter, and a settings control 828 that allows the user to access a tool-settings GUI, here, tool-settings GUI 832 of FIG. 8B, that allows the user to configure the tool, such as by setting filter parameters and/or other parameters, such as appearance of the filter tool. In this connection, tool-settings GUI 832 of FIG. 8B includes 1) an attribute selector 836 that allows the user to select, in this example, a single attribute to filter, 2) a corresponding input means, here a soft slider control 840, that allows the user to select a value for that attribute, and 3) an operator selector 844 that allows the user to select an operator. In this example, the selected attribute, as noted above, is "Body Type", the value is "Wagons/Hatchbacks", and the operator is not-equal-to. Those skilled in the art are aware that many other types of controls, selectors, and other input means may be used.

In this case, the user also had a budget, so they need to filter-out expensive cars. However, the user did not want to move the data points 508 (FIG. 6), since they already knew where most of the candidates lay in scattergram 500. For this situation, the user also selected a movable optical-filter-lens tool 848 that highlights ones 852 of all of the plotted data points 508 that match one or more criteria, performing an analogous, non-manipulative role to a physical-barrier-filter tool, such as physical-barrier filter tool of FIG. 8A. As can be seen in FIG. 8A, highlighted filtered data points 852 appear as circles with darker solid perimeters, whereas the non-highlighted ones of data points 508 are much lighter and less visually distinct. Of course, other highlighting schemes can be used. However, allowing the user to see to one extent or another both highlighted and non-highlighted data points 508 can be useful for the user to maintain context. Optical-filter-lens tool 848 also can optionally affect mechanical physics within its area 856, for example, by only allowing data points 508 that meet its criteria, i.e., highlighted data points 852, to accept interactions, such as selection, for example, by double tapping on touchscreen display 808, for a user to view details of the selected highlighted data point(s). In this example, optical-filter-lens tool 848 further includes graphical representation 860 of an optical lens and a number of soft controls, here a discard (trash) control 864 that allows the user to delete the optical-filter-lens tool and a settings control 868 that allows the user to access a settings menu (not shown) that allows the user to configure the lens tool, such as by setting filter parameters and/or other parameters, such as appearance of the lens tool.

Figure 9:
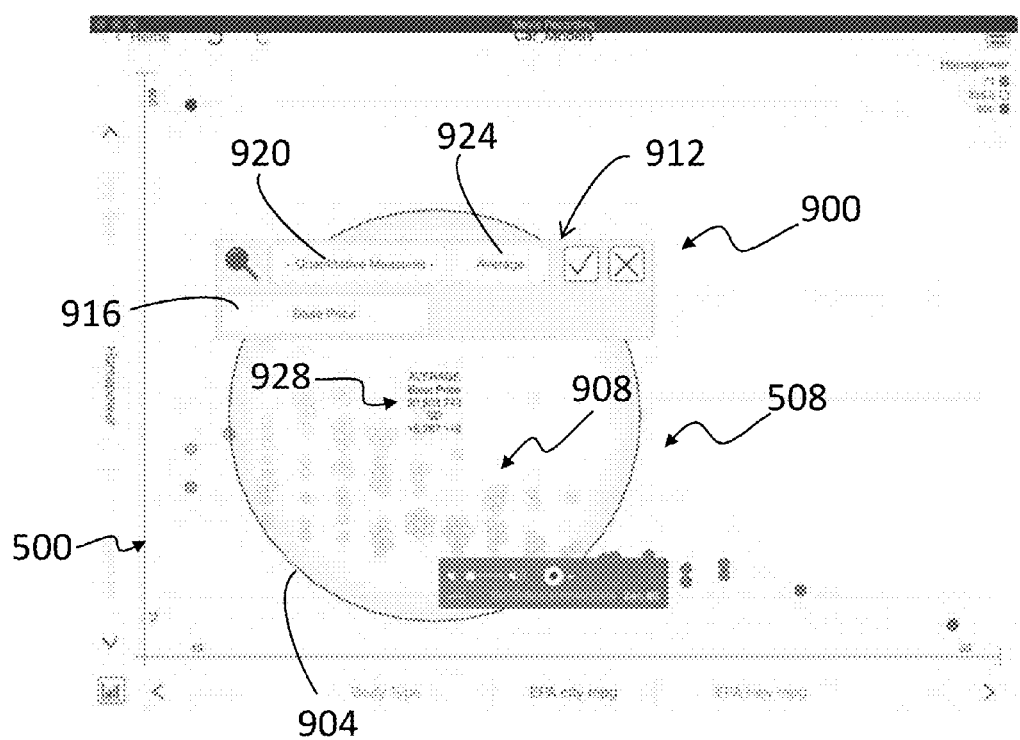
FIG. 9 is a screenshot of the scattergram of FIG. 6, showing an optical quantitative lens filter tool applied to a subset of the data points.

FIG. 9 illustrates one example of an optical quantitative lens filter tool 900 applied to a portion of data points 508 of scattergram 500 of FIG. 6. In the illustrated embodiment of FIG. 9, optical quantitative lens filter tool 900 provides a simulated lens 904 that visually changes the appearance of the ones 908 of data points 508 within the boundary of the lens and also applies a user-selected quantitative measure to data points 908. In this example, optical quantitative lens filter tool 900 includes a tool-settings GUI 912 that allows the user to configure the tool, such as by setting filter parameters and/or other parameters, such as quantitative analysis parameters and/or appearance of the filter tool. In this connection, tool-settings GUI 912 includes 1) an attribute selector 916 that allows the user to select, in this example, a desired attribute, 2) an operation-type selector 920 that allows the user to select the type of operation, and 3) an operator selector 924 that allows the user to select an operator. In this example, the selected attribute is "Base Price", the operation-type is "Quantitative Measures", and the operation is "Average", which causes tool 900, i.e., data visualization and/or manipulation software, to calculate an average, and here, also a standard deviation. In this example, the results of the calculation are displayed in region 928 of simulated lens 904. Those skilled in the art that many other types of controls, selectors, and other input means may be used.

Figure 10:
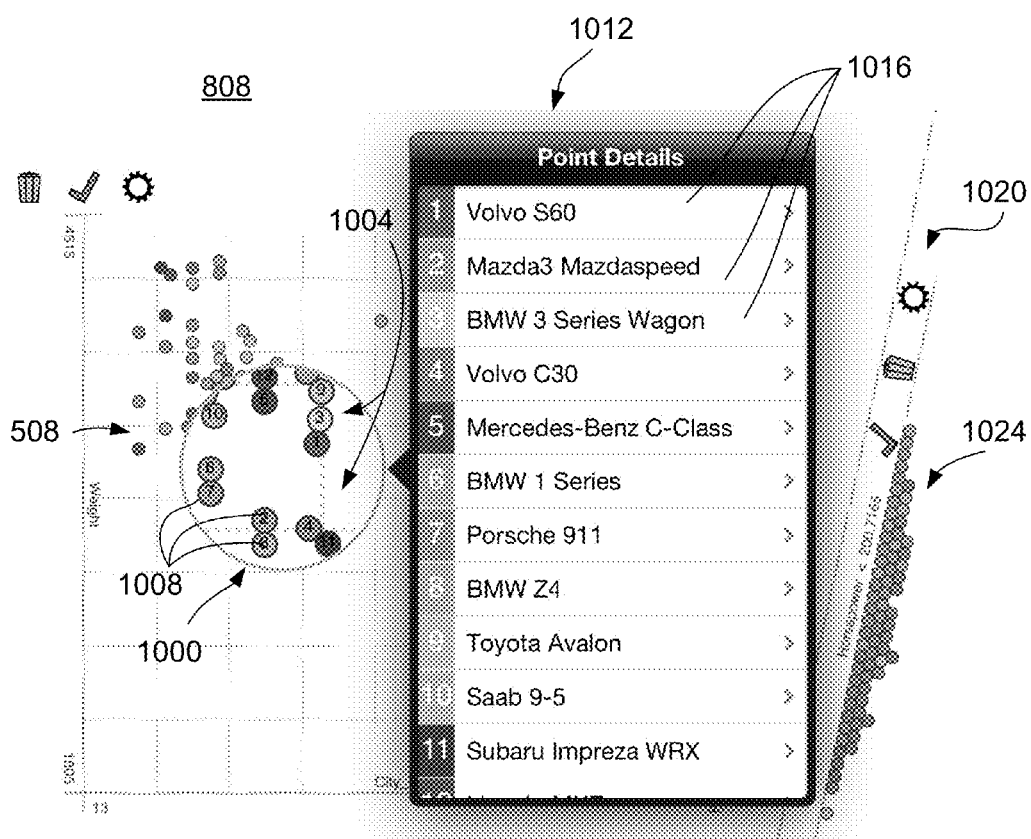
FIG. 10 is a screenshot of a scattergram of weight versus city fuel economy representing the car models of FIG. 5, illustrating a semipermeable physical-barrier-type filter based on horsepower and a detail tool.

As noted above, the user wanted to investigate individual points. Because all of the tools the user used left traces in the physics-based sandbox, it is easy for the user to backtrack and find the points they remembered were interesting candidates. In this example and as illustrated in FIG. 10, the user used a double tap on touchscreen display 808 to cause the software to access a detail view to explore those candidates. In this case, the present inventors wanted to avoid occlusion, so the taps placed a static magnification glass 1000 and showed the details of the ones 1004 of data points 508 within the glass with corresponding respective labels, here, numerical labels 1008, to help the user to pick out the right one. In this example, the detail tool also includes a display of a popup window 1012 that lists the vehicle names corresponding to the magnified data points 1004 along with the labels. In this example, each vehicle name appears in a selectable control box 1016 (only a few labeled for convenience) that, when a user selects one, opens another popup window (not shown) that displays some or all of the attribute values for that vehicle. It is noted that FIG. 10 also displays a semipermeable physical-barrier-type filter tool 1020 that has filtered out filtered data points 1024 based on horsepower being lower than a certain value.

Figure 11:
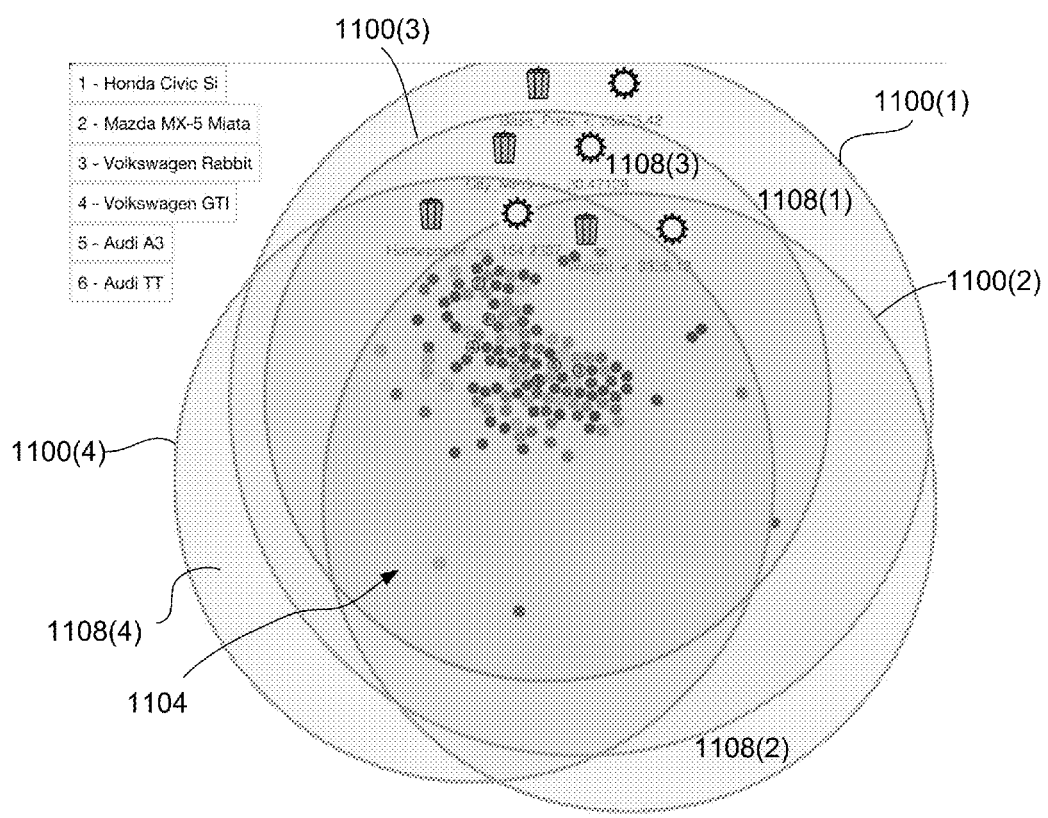
FIG. 11 is a screenshot illustrating four optical lens filter tools applied to a set of the data points of FIG. 5.

FIG. 11 illustrates a very useful feature of some embodiments of the present invention, i.e., the ability of a user to apply multiple physics-based tools, even tools of the same type. In the example shown in FIG. 11, a user has applied four optical-filter-lens tools 1100(1) to 1100(4) to a set of objectified data points 1104, with each successively applied tool overlaying each previously applied tool. In this example, each optical-filter-lens tools 1100(1) to 1100(4) applies its own filter parameter(s) to only the one(s) of data points 1104 that are currently highlighted, i.e., active. In this example, 1) optical-filter-lens tool 1100(1), which is the first tool the user has applied, applies its filter parameter(s) to all data points within its bounds to provide a first set containing filtered active data points, 2) optical-filter-lens tool 1100(2), which is the second tool the user has applied, applies its filter parameter(s) to the ones of the first filtered set within its bounds to create a second set containing double-filtered active data points, 3) optical-filter-lens tool 1100(3), which is the third tool the user has applied, applies its filter parameter(s) to the ones of the second filtered set within its bounds to create a third set containing triple-filtered active data points, and 4) optical-filter-lens tool 1100(4), which is the fourth tool the user has applied, applies its filter parameter(s) to the ones of the third filtered set within its bounds to create a fourth set of quadrupled-filtered active data points. As can be seen in FIG. 11, the corresponding respective regions 1108(1) to 1108(4) of optical-filter-lens tools 1100(1) to 1100(4) may be shaded so that the user can visually identify the order in which they applied the optical-filter-lens tools 1100(1) to 1100(4).

Food Products

Figure 12:
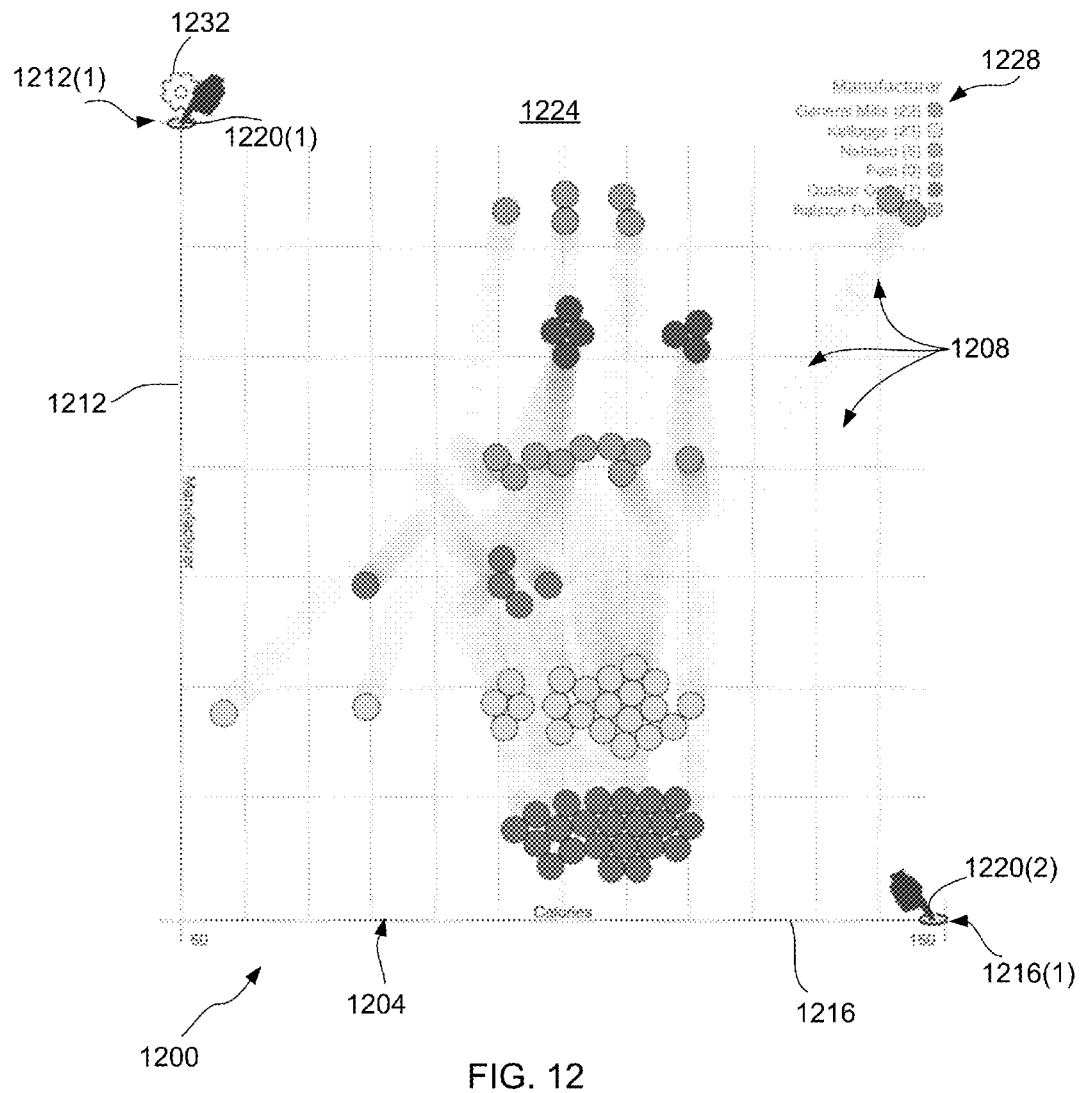
FIG. 12 is a screenshot of a scattergram of manufacturer versus calories for data points representing food products, illustrating ones of the data points being attracted to their charted location in accordance with aspects of the present invention.
Figure 13:
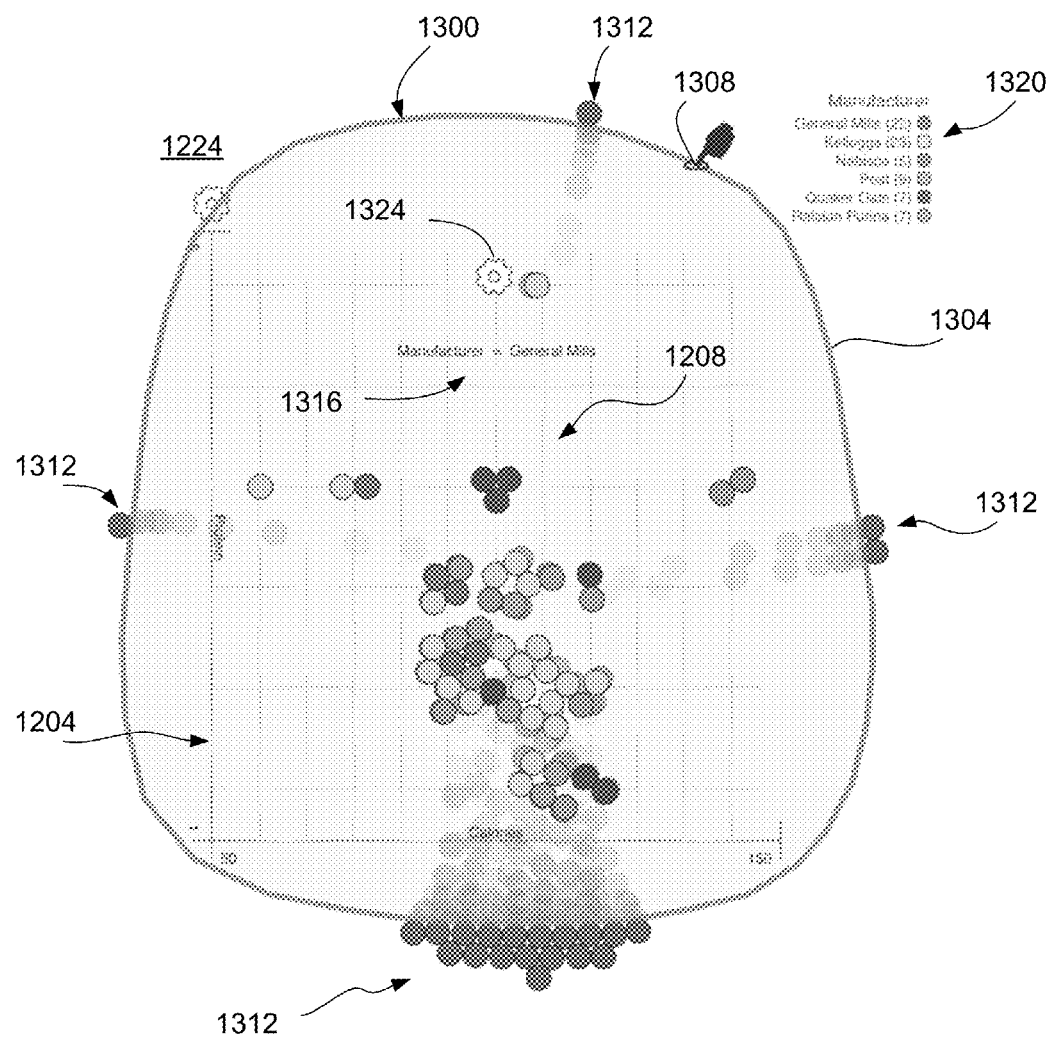
FIG. 13 is a screenshot of a scattergram of protein versus calories for the data points of FIG. 12, illustrating a user applying a semipermeable physical-barrier-type filter based on manufacturer to the data points.
Figure 14:
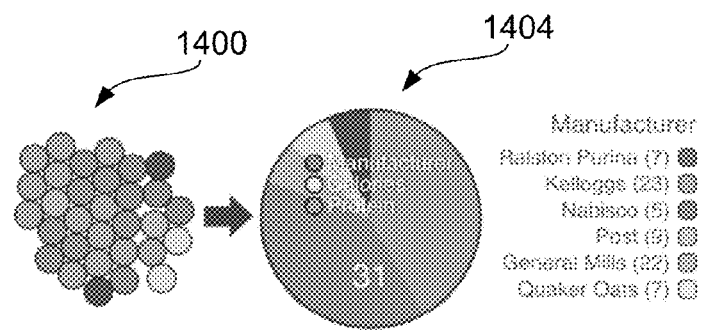
FIG. 14 is a diagram illustrating a grouping tool made in accordance with the present invention.

FIGS. 12 to 14 illustrate simple examples of using multivariate data visualization and manipulation software of the present invention to visualize and manipulate a data set representing food products of various manufacturers. In this example, attributes of the food products include manufacturer name, protein content, and calorie content. FIG. 12 shows a scattergram tool 1200 that includes a scattergram 1204 of manufacturer versus calories, and the objectified data points 1208, here, colored circles, represent corresponding respective food products. FIG. 12 illustrates a single point in time when the objectified data points are being attracted to their final charted locations according to their manufacturers (vertical axis 1212) and calorie content (horizontal axis 1216) from initial, uncharted locations. In the example shown, the illustrated point in time is just before the user finishes drawing scattergram 1204, here by sliding two fingers 1220(1) and 1220(2) along a touchscreen display 1224 at points corresponding to the endpoints 1212(1) and 1216(1) of axes 1212 and 1216, respectively. Once the user lifts fingers 1220(1) and 1220(2) off of touchscreen display 1224, scattergram 1200 becomes set and data points 1208 eventually settle to their final charted locations according to their values of their manufacture and calories, as plotted along axes 1212 and 1216, respectively. In this example, scattergram tool 1200 also includes a legend 1228 for data points 1208, as well as a settings control 1232 that allows the user to access a settings menu (not shown) that allows the user to configure the scattergram tool, such as by setting axis attributes and other parameters.

FIG. 13 illustrates a user applying a semipermeable physical-barrier-filter tool 1300 to scattergram 1204 and plotted data points 1208 of FIG. 12. In this example, semipermeable physical-barrier-filter tool 1300 includes a representation 1304 of a continuous-type filter membrane, which a user may deploy and alter using touching and dragging techniques on touchscreen display 1224, as indicated by user finger 1308 dragging the membrane representation outward from the center of scattergram 1204. In this example, as the user deploys semipermeable physical-barrier-filter tool 1300, ones 1312 of plotted data points 1208 filtered by the physical-barrier-filter tool move to the outside of membrane representation 1304. In this example, semipermeable physical-barrier-filter tool 1300 is set to filter out food products, represented by filters data points 1312, made by General Mills, as indicated in tool label 1316. Also in this example, semipermeable physical-barrier-filter tool 1300 also includes a legend 1320 for data points 1208, as well as a settings control 1324 that allows the user to access a settings menu (not shown) that allows the user to configure the physical-barrier-filter tool, such as by setting one or more filter parameters and other parameters.

An issue with large datasets is screen real estate. To increase scalability and provide the ability to categorize data, the present inventors devised a grouping tool, an example of which is illustrated in FIG. 14. Users may select a set of objectified data points, here data points 1400, for example by selecting a region containing data points or manually choosing individual data points, to incorporate into a group, here group 1404 represented in this example as a pie chart, which is basically an objectification of the collection of data points 1400 in the group. A group, such as group 1404, expresses characteristics of their constituents, for example, obeying forces as if they are a point whose data is the average of their members. Of course, a group may be represented by another graphic, other than a pie chart, depicting the collective objectification.

In some embodiments, the charted location of a group, such as group 1404, is based on a statistic, such as an average, for each pertinent attribute that is based on all values of that attribute for the simulated physical objects composing the group. For example, say group 1404 is being charted on a scattergram of protein versus calories, the data visualization and/or manipulation software may be configured to calculate the averages of each of the protein ($Avg_p$) and the calories ($Avg_c$) for all of objectified data points 1400 in the group, and assign those two averages to the geometric center of the pie chart that represents the group. Then, the location of group 1404 on the protein versus calories scattergram is charted by locating the center of the pie chart at the coordinates ($Avg_c$, $Avg_p$) on the scattergram. Each group, such as group 1404, can then be subjected to any suitable physics-based algorithm(s) disclosed herein as if it were a simulated physical object based on a single data record or graph node. It is noted that using averages is only one function that can be applied. Other functions include but are not limited to weighted mean, geometric mean, max, etc.

In some embodiments, a grouping tool of the present disclosure may be implemented by adding a "Group" column to a data table containing the dataset. When a user selects a group of simulated physical objects for grouping, for example, by lassoing, individual point selection, etc., the data visualization and/or manipulation software may add a group identifier to each of the corresponding selected records in the "Group" column. The data visualization and/or manipulation software will typically provide each group with a unique identifier so that a user may form as many groups as desired. As those skilled in the art will understand, providing a "Group" column to a tabular dataset is just one example of how data visualization and/or manipulation software can be configured to associate the data underlying a selected set of simulated physical objects with a corresponding group.

As a useful extension of grouping, a value transformation tool is a tool a user can use to change attribute values of one or more attributes for one or more simulated physical objects. This allows a user to see how changes to one or more data values impact the data and/or aggregate view of the data. For example, in the context of a stock portfolio say a user owns stock of a variety of companies in various market sectors, such as the industrial sector, energy sector, transportation sector. If the user wants to see the impact on their portfolio of a 10% drop in prices in the energy sector stocks, the user could select all simulated physical objects representing energy sector companies in the portfolio and then apply a transformation tool that reduces each share price of the affected stocks by 10%. If the user has selected, say, a scattergram of market value versus market sector, the 10% change would result in the data visualization and/or manipulation software having to move the affected simulated physical objects to new market value locations, for example, using electrostatic attraction as described above. The data visualization and/or manipulation software can track groupings that a user makes using a value transformation tool using any suitable methodology, such as the additional-column methodology described above. It is noted that each data value transformation applied may be any suitable transformation, such as the addition or subtraction of a constant, application of a percentage, multiplication/division, etc.

Titanic Shipwreck

Figure 15:
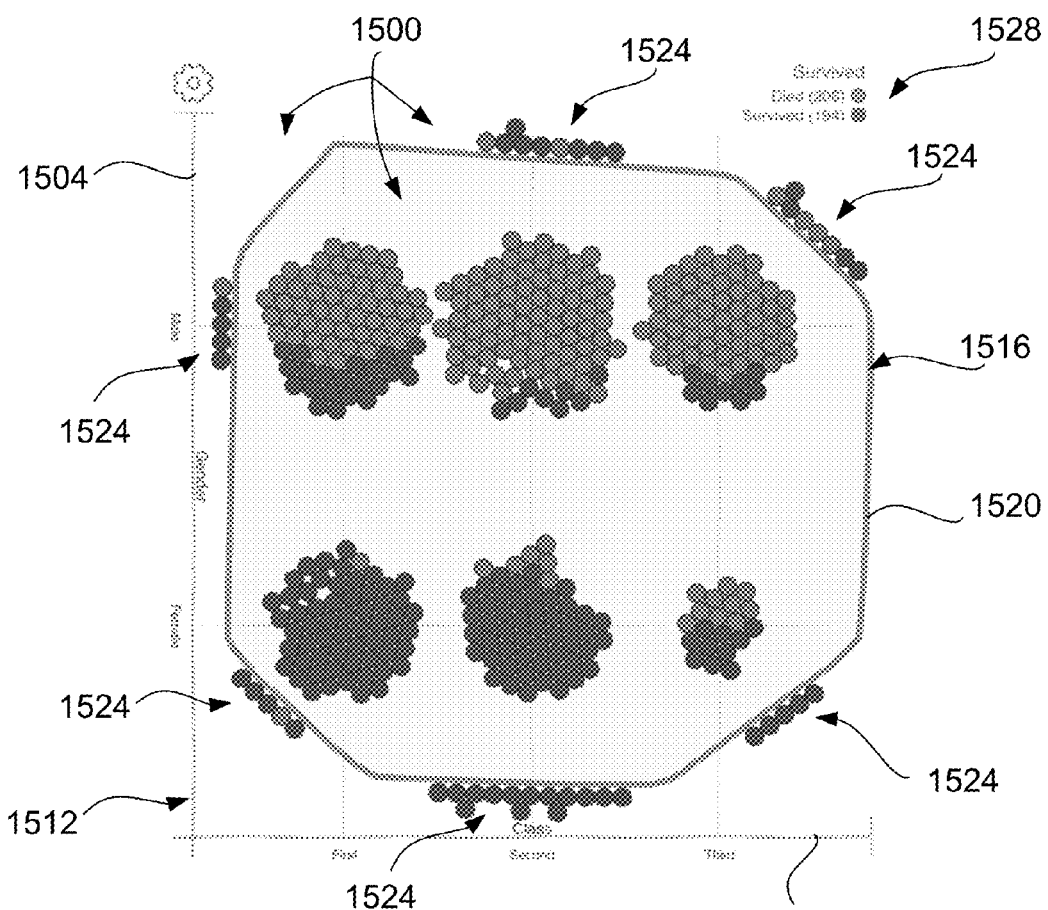
FIG. 15 is screenshot illustrating a scattergram of gender versus travel class for data points representing passengers on the RMS Titanic, illustrating a continuous semipermeable physical-barrier-type filter representing passenger age to the data points.

After watching a movie, a user was interested in the survivors and victims of the infamous Titanic shipwreck. The user was curious if the old adage "women and children first" actually bears out in the data. To test this hypothesis, the user loaded the relevant multivariate data into the computing system executing data visualization and/or manipulation software of the present disclosure. Referring to FIG. 15, the user began by coloring the objectified data points 1500 (i.e., the simulated physical objects) based on survival. In this example, the present inventors implemented separate, color-blind-friendly scales for both continuous and nominal values, and also allow the user to scale data-point size by value.

The user then charted the passengers based on gender (vertical axis 1504) and cabin class (vertical axis 1508) on a scattergram 1512. With a quick glance, it is obvious more women than men survived due to the coloring alone. To investigate how children fared, the user used a semipermeable physical-barrier-filter tool 1516 to draw a semipermeable physical-barrier-filter membrane 1520 around the data, which pushes out ones 1524 of data points 1500 corresponding to passengers whose age is less than 18. Because filtered data points 1524 still felt an attractive pull to their charted locations in scattergram 1512, this has the emergent property of keeping the filtered data points separated into gender/class groups. From this updated chart 1528, i.e. original scattergram 1512 plus applied semipermeable physical-barrier-filter tool 1516, the user drew the conclusion that indeed most children survived, though male children in the third class still faced poor odds.

Figure 16:
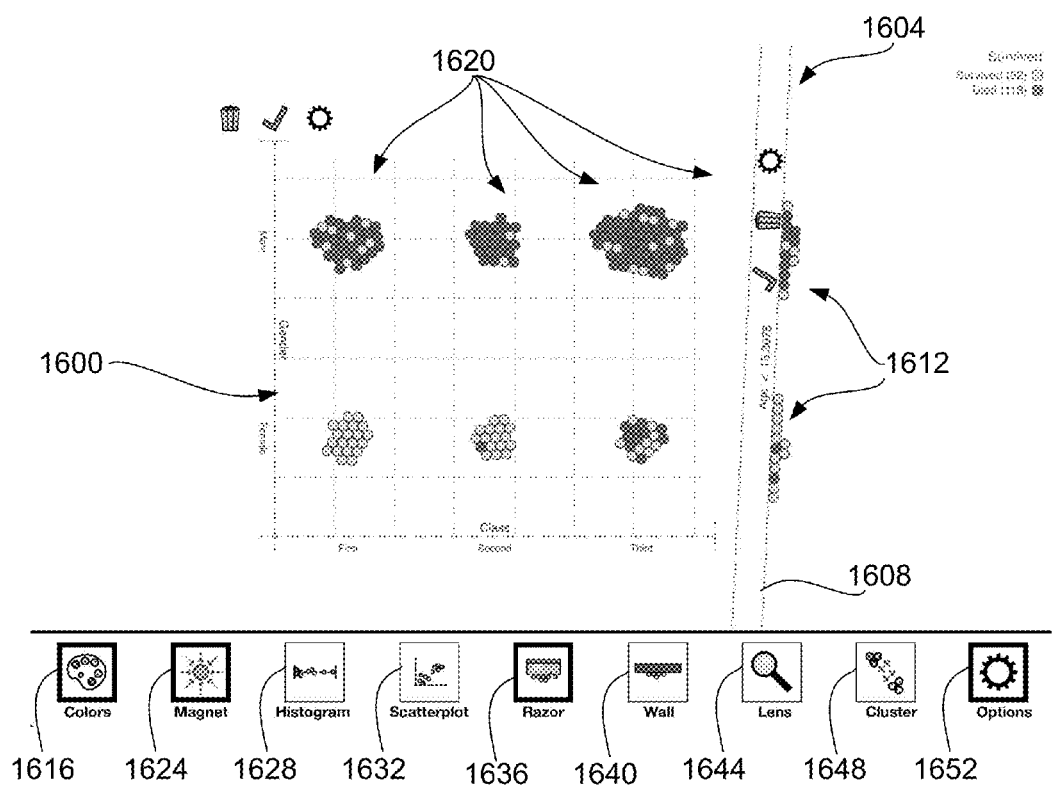
FIG. 16 is a screenshot illustrating a scattergram of gender versus travel class for data points representing passengers on the RMS Titanic, illustrating an open semipermeable physical-barrier-type filter representing passenger age to the data points.

FIG. 16 illustrates a scattergram 1600 similar to scattergram 1512 of FIG. 15, but with a different semipermeable physical-barrier-filter tool 1604 applied. In this example, semipermeable physical-barrier-filter tool 1604 is a "Razor" tool, which provides a straight-line semipermeable physical-barrier filter 1608, which is distinguishable from the "Wall" semipermeable physical-barrier-filter membrane 1520 of FIG. 15. In this example, the filter parameter is based on the age attribute. As readily seen, this razor filter 1608 loses some information concerning the groups from which the filtered data points 1612 came, but still provides useful information to the user. In the example of FIG. 16, the screenshot also shows a set of soft controls that allow the user to select various tools and features of the multivariate data visualization and manipulation software. In the embodiment shown, these soft controls include: a "Colors" control 1616 that activates a colors tool (not shown) that allows the user to apply colors to the objectified data points 1620; a "Magnet" control 1624 that activates a magnet tool (not shown) that allows a user to apply one or more magnets (not shown); a "Histogram" selector 1628 that activates a histogram tool (not shown) that allows a user to create a histogram; a "Scatterplot" selector 1632 that activates a scattergram tool (not shown) that allows a user to create a scattergram; a "Razor" selector 1636 that activates a razor-type semipermeable physical-barrier-filter tool (not shown) that allows a user to apply a razor-type semipermeable physical-barrier-filter; a "Wall" selector 1640 that activates a wall-type semipermeable physical-barrier-filter tool (not shown) that allows a user to apply a wall-type semipermeable physical-barrier-filter; a "Lens" selector 1644 that activates an optical-filter-lens tool (not shown) that allows a user to apply an optical filter lens; a "Cluster" selector 1648 that activates a cluster tool (not shown) that allows a user to manipulate clusters of data points; and an "Options" selector 1652 that activates a settings menu (not shown) that allows the user to configure various options for the physics-based sandbox.

Acquaintance Network

Figure 17A:
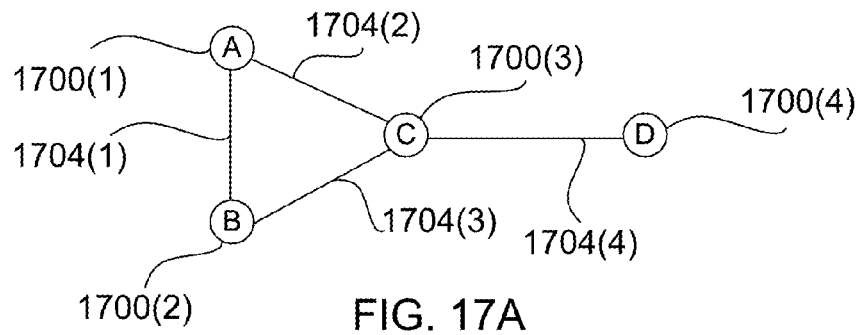
FIG. 17A is a partial screenshot illustrating a network of graph-type data, in which the nodes are objectified in accordance with aspects of the present invention.
Figure 17B:
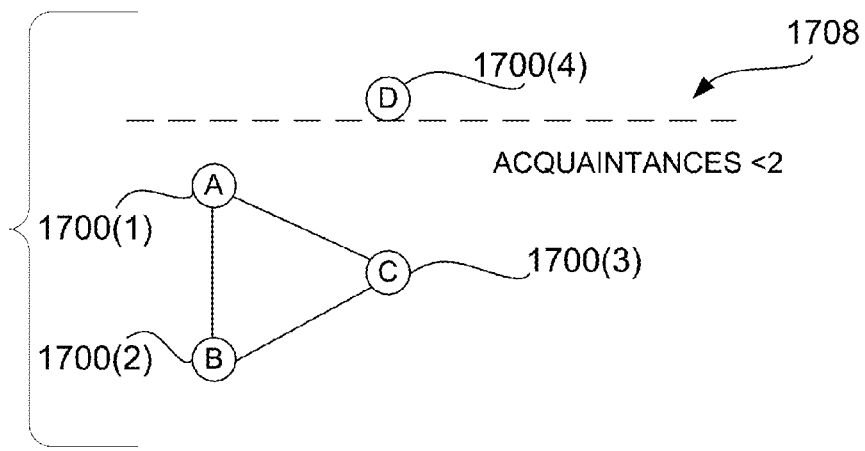
FIG. 17B is a partial screenshot of the network of FIG. 17A, showing a physical barrier filter tool applied to the graph-type data.
Figure 17C:
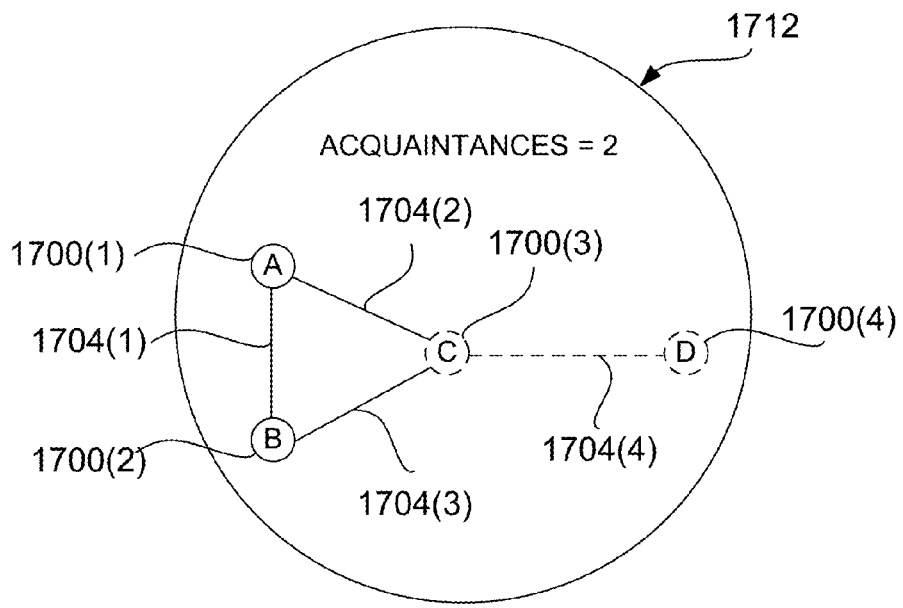
FIG. 17C is a partial screenshot of the network of FIG. 17A, showing an optical filter lens tool applied to the graph data.

Whereas each of the foregoing examples is based on a corresponding multivariate dataset, the following example is based on graph dataset. In this example, the dataset is a set of four individuals (nodes), A, B, C, and D and a set of acquaintance relationships (edges). In this example, each of individuals A, B, and C know each other, but only C is an acquaintance of individual D. As seen in FIG. 17A, each node (individual) is objectified as a corresponding simulated physical object, or data point 1700(1) to 1700(4)) and the data visualization and/or manipulation software may attract and repulse the data points toward and away from one another to their charted locations using an electromagnetic attraction/repulsion algorithm. Once data points 1700(1) to 1700(4) have settled to their charted locations and the data visualization and/or manipulation software has rendered the corresponding edges 1704(1) to 1704(4) (i.e., acquaintance relationships), a user may apply one or more simulated physical tools, such as one or more of the physical barrier filter and/or optical filter lens tools described above. For example, in FIG. 17B, the user has applied a physical barrier filter tool 1708 that filters out data points having only a single edge (acquaintance), here data point 1700(4). As another example, in FIG. 17C the user has applied an optical filter lens tool 1712 that filters data points having exactly two edges (acquaintances). In this example, optical filter lens tool 1712 highlights data points 1700(1) and 1700(2), each of which has only two edges, i.e., edges 1704(1) and 1704(2) for data point 1700(1) and edges 1704(1) and 1704(3) for data point 1700(2).

Modeling Techniques

The present inventors have discovered a number of useful modeling techniques for ensuring that data visualization and/or manipulation software of the present disclosure performs properly, for example, attracts simulated physical objects to their proper charted locations and physical barrier filter tools properly filter simulated physical objects, and provides users with satisfying visual experiences. For example, the present inventors have found that simulated physical objects can collide with one another and impede movement of simulated physical objects to their proper charted locations. One can envision this occurring, for example, in a scattergram that has a large, dense cluster of simulated physical objects that physically block a simulated physical object having a final plotted location on the opposite side of the cluster from where that simulated physical object is currently located. In this case and in the absence of highly complex object interaction algorithms that are computationally too expensive, application of a typical electromagnetic attraction algorithm between the blocked simulated physical object and its final plotted location may be useless in allowing the blocked simulated physical object to pass through the cluster.

To solve such blockage issues, the present inventors use the grouping feature discussed above to assign simulated physical objects to different groups and then run the relevant electromagnetic attraction algorithm and/or any other physics-based algorithm(s) on each group independently of the other and simultaneously with one another. One can envision these groups to be on multiple physical layers, such that movement of simulated physical objects on one layer do not interfere with movement of simulated physical objects on another layer. In the blocking-cluster example mentioned above, the data visualization and/or manipulation software can assign all of the simulated physical objects in the blocking cluster to a first layer (e.g., by putting a suitable first-layer identifier in a "Layer" column or the like for each corresponding data record) and the blocked simulated physical object to a second layer (e.g., by putting a suitable second-layer identifier in the Layer column or the like for the corresponding data record). Then, the data visualization and/or manipulation software may run the same electrostatic attraction algorithm on each of the first and second layers simultaneously and render the resulting motion in real time. Because the blocking cluster and the blocked simulated physical object are now on separate layers, the rendered motion shows the previously blocked simulated physical object traversing the previously blocking cluster, thereby allowing the previously blocked simulated physical object to properly settle in its proper charted location.

After the simulated physical objects have settled in their proper locations, the data visualization and/or manipulation software may collapse all simulated physical objects to a single layer or more than one layer, but fewer layers than implemented for application of the electromagnetic attraction algorithm and/or other physics-based algorithm(s). A reason to collapse to more than one layer may be the need to use a physical-barrier-type filtering tool wherein locating various ones of the simulated physical objects on differing layers avoids blocking that prevents certain simulated physical objects, that should pass through the filter, from passing through the filter. In some embodiments, the placing of simulated physical objects on differing layers can be initiated by a user selecting a physics-based tool that is going to require movement of one or more of the simulated physical objects.

The data visualization and/or manipulation software may determine the number of layers utilized and/or the assignments of simulated physical objects to layers based on one or more suitable criteria that are dependent on the type of tool selected. For example, if the user selects a charting tool or changes axis attributes on a chart, the data visualization and/or manipulation software may analyze the current and final locations of the simulated physical objects to determine where interference may occur and then assign interfering ones of the simulated physical objects to differing layers. As another example, if the user selects a physical-barrier-filter tool, the data visualization and/or manipulation software may assign the ones of the simulated physical objects that are to pass through the filter to one layer and the ones of the simulated physical objects that are not to pass through the filter to a different layer. Other assignment schemes can be devised and implemented.

Exemplary Computing System

It is to be noted that any one or more of the aspects and embodiments described herein may be conveniently implemented using one or more machines programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing system) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing system) and any related information (e.g., data structures and data) that causes the machine to perform any one of the methodologies and/or embodiments described herein.

As already noted in the context of FIG. 2, examples of a computing system include, but are not limited to, an electronic book reading device, a computer workstation, a terminal computer, a server computer, a wearable computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing system may include and/or be included in a kiosk.

Figure 18:
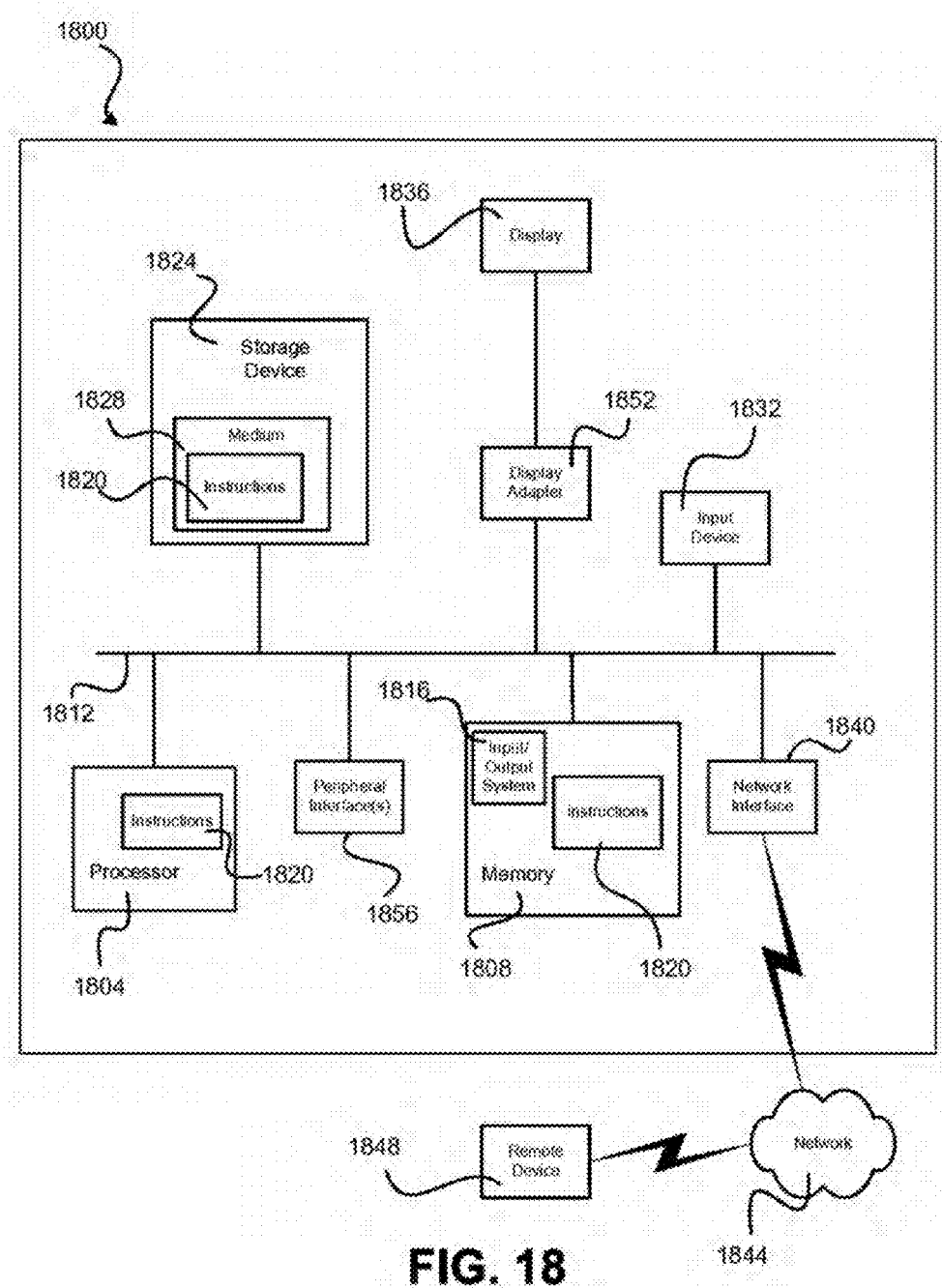
FIG. 18 is a diagrammatic view of a computing system suitable for use in executing aspects of the present invention.

FIG. 18 shows a diagrammatic representation of one embodiment of a computing system in the exemplary form of a computer system 1800 within which a set of instructions for causing a control system to perform any one or more of the aspects and/or methodologies of the present disclosure, such as methods 100 and 300 of FIGS. 1 and 3, respectively, may be executed. It is also contemplated that multiple computing systems may be utilized to implement a specially configured set of instructions for causing one or more of the devices to perform any one or more of the aspects and/or methodologies of the present disclosure. Computer system 1800 includes a processor 1804 and a memory 1808 that communicate with each other, and with other components, via a bus 1812. Bus 1812 may include any of several types of bus structures including, but not limited to, a memory bus, a memory controller, a peripheral bus, a local bus, and any combinations thereof, using any of a variety of bus architectures.

Memory 1808 may include various components (e.g., machine readable media) including, but not limited to, a random access memory component, a read only component, and any combinations thereof. In one example, a basic input/output system 1816 (BIOS), including basic routines that help to transfer information between elements within computer system 1800, such as during start-up, may be stored in memory 1808. Memory 1808 may also include (e.g., stored on one or more machine-readable media) instructions (e.g., software) 1820 embodying any one or more of the aspects and/or methodologies of the present disclosure. In another example, memory 1808 may further include any number of program modules including, but not limited to, an operating system, one or more application programs, other program modules, program data, and any combinations thereof.

Computer system 1800 may also include a storage device 1824. Examples of a storage device (e.g., storage device 1824) include, but are not limited to, a hard disk drive, a magnetic disk drive, an optical disc drive in combination with an optical medium, a solid-state memory device, and any combinations thereof. Storage device 1824 may be connected to bus 1812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1824 (or one or more components thereof) may be removably interfaced with computer system 1800 (e.g., via an external port connector (not shown)). Particularly, storage device 1824 and an associated machine-readable medium 1828 may provide nonvolatile and/or volatile storage of machine-readable instructions, data structures, program modules, and/or other data for computer system 1800. In one example, software 1820 may reside, completely or partially, within machine-readable medium 1828. In another example, software 1820 may reside, completely or partially, within processor 1804.

Computer system 1800 may also include an input device 1832. In one example, a user of computer system 1800 may enter commands and/or other information into computer system 1800 via input device 1832. Examples of an input device 1832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1832 may be interfaced to bus 1812 via any of a variety of interfaces (not shown) including, but not limited to, a serial interface, a parallel interface, a game port, a USB interface, a FIREWIRE interface, a direct interface to bus 1812, and any combinations thereof. Input device 1832 may include a touch screen interface that may be a part of or separate from display 1836, discussed further below. Input device 1832 may be utilized as a user selection device for selecting one or more graphical representations in a graphical interface as described above.

A user may also input commands and/or other information to computer system 1800 via storage device 1824 (e.g., a removable disk drive, a flash drive, etc.) and/or network interface device 1840. A network interface device, such as network interface device 1840, may be utilized for connecting computer system 1800 to one or more of a variety of networks, such as network 1844, and one or more remote devices 1848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing systems, and any combinations thereof. A network, such as network 1844, may employ a wired and/or a wireless mode of communication. In general, any network topology may be used. Information (e.g., data, software 1820, etc.) may be communicated to and/or from computer system 1800 via network interface device 1840.

Computer system 1800 may further include a video display adapter 1852 for communicating a displayable image to a display device, such as display device 1836. Examples of a display device include, but are not limited to, a liquid crystal display (LCD), a cathode ray tube (CRT), a plasma display, a light emitting diode (LED) display, and any combinations thereof. Display adapter 1852 and display device 1836 may be utilized in combination with processor 1804 to provide graphical representations of aspects of the present disclosure. In addition to a display device, computer system 1800 may include one or more other peripheral output devices including, but not limited to, an audio speaker, a printer, and any combinations thereof. Such peripheral output devices may be connected to bus 1812 via a peripheral interface 1856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of enabling a user to visualize a data set on a graphical display of a computing system, wherein the data set contains a plurality of records each having a plurality of attributes common to the plurality of records, the method comprising:

displaying, by the computing system, a physics-based sandbox on the graphical display, wherein the physics-based sandbox contains a chart having at least one axis representing a corresponding attribute of the plurality of attributes;

objectifying, by the computing system, each of the plurality of records to create a corresponding plurality of simulated physical objects, wherein each of the simulated physical objects defines a peripheral boundary that simulates an exterior surface of a real-world physical object, wherein each of the simulated physical objects has a corresponding plot location on the chart based on the attribute of the at least one axis;

displaying the simulated physical objects in the physics-based sandbox, wherein said displaying includes:

applying an attraction algorithm to attract each simulated physical object toward the corresponding plot location by simulating electromagnetic attraction between each simulated physical object and the corresponding plot location; and when ones of the simulated physical objects are attracted to identical or proximate plot locations, applying a collision algorithm in conjunction with the attraction algorithm to cause the ones of the simulated physical objects to collide with one another and cluster together with corresponding respective peripheral boundaries abutting one another;

receiving, by the computing system, a user selection of a physics-based data-manipulation tool, wherein the physics-based data-manipulation tool invokes a physics-based interaction with one or more of the plurality of simulated physical objects, wherein the physics-based interaction is modeled by one or more physics-based modeling algorithms;

displaying a graphical representation of the physics-based data-manipulation tool in the physics-based sandbox;

determining, by the computing system, which one or more of the plurality of simulated physical objects experiences the physics-based interaction;

applying, by the computing system, the one or more physics modeling algorithms to each of the plurality of simulated physical objects determined to experience the physics-based interaction so as to determine at least one updated graphical representation for each of the one or more of the plurality of physical objects experiencing the physics-based interaction; and rendering each of the at least one updated graphical representation in the physics-based sandbox.

2. A method according to claim 1, wherein the chart is a histogram; and said displaying a graphical representation of the data-manipulation tool includes displaying a histogram axis for the histogram in the physics-based sandbox.

3. A method according to claim 1, wherein:

the chart is a scattergram and said displaying a graphical representation of the data-manipulation tool includes displaying scattergram axes for the scattergram in the physics-based sandbox, the scattergram axes having first and second axes orthogonal to one another and representing, respectively, first and second attributes of the plurality of attributes, wherein each of the simulated physical objects has a corresponding plot location based on the first and second attributes.

4. A method according to claim 1, wherein said applying an attraction algorithm includes applying an algorithm in which a force of attraction diminishes with increasing distance between each simulated physical object and the corresponding plot location.

5. A method according to claim 1, wherein said receiving a user selection of a physics-based data-manipulation tool includes receiving a user selection of a physical barrier filter designed and configured to allow passage therethrough of each of the plurality of simulated physical objects satisfying one or more filtering parameters;

displaying the physical barrier filter at a location in the physics-based sandbox wherein the physical barrier filter can filter ones of the plurality of simulated physical objects during attraction of the plurality of simulated physical objects to the corresponding respective plot locations on the chart; and filtering, by the physical barrier filter, the ones of the plurality of simulated physical objects based on the one or more filtering parameters so as to block each of the plurality of simulated physical objects not satisfying the one or more filter parameters from reaching the corresponding plot location and to allow each of the plurality of simulated physical objects satisfying the one or more filter parameters to pass through the physical barrier filter so as to reach the corresponding plot location.

6. A method according to claim 5, further comprising applying a binary filtering algorithm to the simulated physical objects based on the one or more filtering parameters so as to designate which of the plurality of simulated physical objects are permitted to pass through the physical barrier filter.

7. A method according to claim 1,
wherein:
said receiving a user selection of a data-manipulation tool includes receiving a selection of a simulated physical tool;
said displaying a graphical representation of the data-manipulation tool includes displaying the simulated physical tool in the physics-based sandbox; and
said applying the one or more physics modeling algorithms includes applying the one or more physics modeling algorithms with the plurality of physical objects initially in the plot locations.

8. A method according to claim 7, wherein said receiving a user selection of a simulated physical tool includes receiving a user selection of a filter designed and configured to filter the plurality of simulated physical objects based on values of at least one of the plurality of attributes based on one or more filtering parameters.

9. A method according to claim 8, wherein said receiving a user selection of a filter includes receiving a user selection of a first optical lens filter designed and configured to visually highlight each of the plurality of simulated physical objects satisfying the one or more optical filtering parameters while still displaying in a non-visually-highlighted manner each of the plurality of simulated physical objects not satisfying the one or more optical filtering parameters.

10. A method according to claim 9, further comprising receiving a user selection of at least one second optical lens filter and graphically overlaying the at least one second optical lens filter with the first optical lens filter.

11. A method according to claim 8, wherein said receiving a user selection of a filter includes receiving a user selection of a physical barrier filter designed and configured to allow passage therethrough of each of the plurality of simulated physical objects satisfying the one or more filtering parameters such that, when a user moves the physical barrier filter, the physical barrier filter pushes any of the plurality of simulated physical objects satisfying the one or more filtering parameters away from the corresponding plot location.

12. A method according to claim 11, further comprising applying a binary filtering algorithm to the simulated physical objects based on the one or more filtering parameters so as to designate which of the plurality of simulated physical objects are permitted to pass through the physical barrier filter and which of the plurality of simulated physical objects are to be pushed by the physical barrier filter.

13. A method according to claim 11, further comprising receiving user input that moves the physical barrier filter across at least some of the plot locations, whereby filtering occurs during movement of the physical barrier.

14. A method according to claim 7, wherein said receiving a selection of a simulated physical tool includes receiving a selection of an attraction-repulsion tool designed and configured to move one or more of the plurality of simulated physical objects away from the corresponding plot location(s) based on an electromagnetic force mapped to a selected value of one of the plurality of attributes, the method further comprising receiving a user input designating a location in the physics-based sandbox for the attraction-repulsion tool.

15. A method according to claim 1, further comprising:
receiving a user selection of a subset of the plurality of simulated physical objects;
objectifying the subset of the plurality of simulated physical objects as a group representation having a boundary representing an exterior surface of a physical object; and
applying the one or more physics modeling algorithms to the group representation.

16. A method according to claim 15, further comprising applying the one or more physics modeling algorithms to the group representation based on a function applied to one or more of the plurality of attributes for the subset.

17. A method according to claim 1, further comprising:
assigning differing ones of the plurality of simulated physical objects to a plurality of differing layers so as to control collisions during movement of the differing ones of the plurality of simulated physical objects; and
executing a selected physics-based modeling algorithm for each of the plurality of differing layers.

18. A method according to claim 17, further comprising, when said executing is done, collapsing the plurality of differing layers into a single layer.

19. A method according to claim 17, further comprising, when said executing is done, collapsing the plurality of differing layers into more than one layer.

20. A method according to claim 1, further comprising:
receiving a user selection of a subset of the plurality of simulated physical objects;
receiving user changes to values of at least one attribute for the subset of the plurality of simulated physical objects to create modified values; and
applying the one or more physics modeling algorithms to the simulated physical objects in the subset based on the modified values.

21. A method according to claim 1, wherein said receiving a user selection of a data-manipulation tool includes receiving a selection of a barrier-wall filter having one or more filter parameters, that, in response to user activation, surrounds a region of plot locations and holds each simulated physical object not satisfying the one or more filter parameters in spaced relation to the corresponding plot location against the electromagnetic attraction between the simulated physical object and the corresponding plot location.

22. A machine-readable storage medium containing machine-executable instructions for performing a method of enabling a user to visualize a data set on a graphical display of a computing system, wherein the data set contains a plurality of records each having a plurality of attributes common to the plurality of records, said machine-executable instructions comprising:
a first set of machine-executable instructions for displaying, by the computing system, a physics-based sandbox on the graphical display, wherein the physics-based sandbox contains a chart having at least one axis representing a corresponding attribute of the plurality of attributes;

a second set of machine-executable instructions for objectifying, by the computing system, each of the plurality of records to create a corresponding plurality of simulated physical objects, wherein each of the simulated physical objects defines a peripheral boundary that simulates an exterior surface of a real-world physical object, wherein each of the simulated physical objects has a corresponding plot location on the chart based on the attribute of the at least one axis;

a third set of machine-executable instructions for displaying the simulated physical objects in the physics-based sandbox, wherein said displaying includes:
  applying an attraction algorithm to attract each simulated physical object toward the corresponding plot location by simulating electromagnetic attraction between each simulated physical object and the corresponding plot location; and
  when ones of the simulated physical objects are attracted to identical or proximate plot locations, applying a collision algorithm in conjunction with the attraction algorithm to cause the ones of the simulated physical objects to collide with one another and cluster together with corresponding respective peripheral boundaries abutting one another;

a fourth set of machine-executable instructions for receiving, by the computing system, a user selection of a physics-based data-manipulation tool, wherein the physics-based data-manipulation tool invokes a physics-based interaction with one or more of the plurality of simulated physical objects, wherein the physics-based interaction is modeled by one or more physics-based modeling algorithms;

a fifth set of machine-executable instructions for displaying a graphical representation of the physics-based data-manipulation tool in the physics-based sandbox;

a sixth set of machine-executable instructions for determining, by the computing system, which one or more of the plurality of simulated physical objects experiences the physics-based interaction;

a seventh set of machine-executable instructions for applying, by the computing system, the one or more physics modeling algorithms to each of the plurality of simulated physical objects determined to experience the physics-based interaction so as to determine at least one updated graphical representation for each of the one or more of the plurality of physical objects experiencing the physics-based interaction; and an eighth set of machine-executable instructions for rendering each of the at least one updated graphical representation in the physics-based sandbox.

23. A machine-readable storage medium according to claim 22, wherein
the chart is a histogram and
said fifth set of machine-executable instructions includes machine-executable instructions for displaying a histogram axis for the histogram in the physics-based sandbox.

24. A machine-readable storage medium according to claim 22, wherein
the chart is a scattergram and
said fifth set of machine-executable instructions includes machine-executable instructions for displaying scattergram axes for the scattergram in the physics-based sandbox, the scattergram axes having first and second axes orthogonal to one another and representing, respectively, first and second attributes of the plurality of attributes, wherein each of the simulated physical objects has a corresponding plot location based on the first and second attributes.

25. A machine-readable storage medium according to claim 22, wherein said machine-executable instructions for applying an attraction algorithm include machine-executable instructions for applying an algorithm in which a force of attraction diminishes with increasing distance between each simulated physical object and the corresponding plot location.

26. A machine-readable storage medium according to claim 22, further comprising:
  a ninth set of machine-executable instructions for receiving a user selection of a physical barrier filter designed and configured to allow passage therethrough of each of the plurality of simulated physical objects satisfying one or more filtering parameters;
  a tenth set of machine-executable instructions for displaying the physical barrier filter at a location in the physics-based sandbox wherein the physical barrier filter can filter ones of the plurality of simulated physical objects during attraction of the plurality of simulated physical objects to the corresponding respective locations on the chart; and
  an eleventh set of machine-executable instructions for filtering, by the physical barrier filter, the ones of the plurality of simulated physical objects based on the one or more filtering parameters so as to block each of the plurality of simulated physical objects not satisfying the one or more filter parameters from reaching the corresponding plot location and to allow each of the plurality of simulated physical objects satisfying the one or more filter parameters to pass through the physical barrier filter so as to reach the corresponding plot location.

27. A machine-readable storage medium according to claim 26, further comprising a twelfth set of machine-executable instructions for applying a binary filtering algorithm to the simulated physical objects based on the one or more filtering parameters so as to designate which of the plurality of simulated physical objects are permitted to pass through the physical barrier filter.

28. A machine-readable storage medium according to claim 22,
wherein:
  said fourth set of machine-executable instructions includes machine-executable instructions for receiving a selection of a simulated physical tool;
  said fifth set of machine-executable instructions includes machine-executable instructions for displaying the simulated physical tool in the physics-based sandbox; and
  said seventh set of machine-executable instructions includes machine-executable instructions for applying the one or more physics modeling algorithms with the plurality of physical objects initially in the plotted locations.

29. A machine-readable storage medium according to claim 28, wherein said fourth set of machine-executable instructions includes machine-executable instructions for receiving a user selection of a filter designed and configured to filter the plurality of simulated physical objects based on values of at least one of the plurality of attributes based on one or more filtering parameters.

30. A machine-readable storage medium according to claim 29, wherein said machine-executable instructions for receiving a user selection of a filter includes machine-executable instructions for receiving a user selection of a first optical lens filter designed and configured to visually highlight each of the plurality of simulated physical objects satisfying the one or more optical filtering parameters while still displaying in a non-visually-highlighted manner each of the plurality of simulated physical objects not satisfying the one or more optical filtering parameters.

31. A machine-readable storage medium according to claim 30, further comprising an eleventh set of machine-executable instructions for receiving a user selection of at least one second optical lens filter and graphically overlaying the at least one second optical lens filter with the first optical lens filter.

32. A machine-readable storage medium according to claim 29, wherein said machine-executable instructions for receiving a user selection of a filter includes receiving a user selection of a physical barrier filter designed and configured to allow passage therethrough of each of the plurality of simulated physical objects satisfying the one or more filtering parameters such that, when a user moves the physical barrier filter, the physical barrier filter pushes any of the plurality of simulated physical objects satisfying the one or more filtering parameters away from the corresponding plot location.

33. A machine-readable storage medium according to claim 32, further comprising an eleventh set of machine-executable instructions for applying a binary filtering algorithm to the simulated physical objects based on the one or more filtering parameters so as to designate which of the plurality of simulated physical objects are permitted to pass through the physical barrier filter and which of the plurality of simulated physical objects are to be pushed by the physical barrier filter.

34. A machine-readable storage medium according to claim 32, further comprising an eleventh set of machine-executable instructions for receiving user input that moves the physical barrier filter across at least some of the plot locations, whereby filtering occurs during movement of the physical barrier.

35. A machine-readable storage medium according to claim 28, wherein said machine-executable instructions for receiving a selection of a simulated physical tool includes machine-executable instructions for receiving a selection of an attraction-repulsion tool designed and configured to move one or more of the plurality of simulated physical objects away from the corresponding plot location(s) based on an electromagnetic force mapped to a selected value of one of the plurality of attributes, the machine-readable storage medium further comprising an eleventh set of machine-executable instructions for receiving a user input designating a location in the physics-based sandbox for the attraction-repulsion tool.

36. A machine-readable storage medium according to claim 22, further comprising:
a ninth set of machine-executable instructions for receiving a user selection of a subset of the plurality of simulated physical objects;
a tenth set of machine-executable instructions for objectifying the subset of the plurality of simulated physical objects as a group representation having a boundary representing an exterior surface of a physical object; and
an eleventh set of machine-executable instructions for applying the one or more physics modeling algorithms to the group representation.

37. A machine-readable storage medium according to claim 36, further comprising a twelfth set of machine-executable instructions for applying the one or more physics modeling algorithms to the group representation based on a function applied to one or more of the plurality of attributes for the subset.

38. A machine-readable storage medium according to claim 22, further comprising:
a ninth set of machine-executable instructions for assigning differing ones of the plurality of simulated physical objects to a plurality of differing layers so as to control collisions during movement of the differing ones of the plurality of simulated physical objects; and
a tenth set of machine-executable instructions for executing a selected physics-based modeling algorithm for each of the plurality of differing layers.

39. A machine-readable storage medium according to claim 38, further comprising an eleventh set of machine-executable instructions for, when said executing is done, collapsing the plurality of differing layers into a single layer.

40. A machine-readable storage medium according to claim 38, further comprising an eleventh set of machine-executable instructions for, when said executing is done, collapsing the plurality of differing layers into more than one layer.

41. A machine-readable storage medium according to claim 22, further comprising:
a ninth set of machine-executable instructions for receiving a user selection of a subset of the plurality of simulated physical objects;
a tenth set of machine-executable instructions for receiving user changes to values of at least one attribute for the subset of the plurality of simulated physical objects to create modified values; and
an eleventh set of machine-executable instructions for applying the one or more physics modeling algorithms to the simulated physical objects in the subset based on the modified values.

42. A machine-readable storage medium according to claim 22, wherein said fourth set of machine-executable instructions includes machine-executable instructions for receiving a selection of a barrier-wall filter having one or more filter parameters, that, in response to user activation, surrounds a region of plot locations and holds each simulated physical object not satisfying the one or more filter parameters in spaced relation to the corresponding plot location against the electromagnetic attraction between the simulated physical object and the corresponding plot location.

43. A method of enabling a user to visualize a data set on a graphical display of a computing system, wherein the data set contains a plurality of records each having a plurality of attributes common to the plurality of records, the method comprising:
displaying, by the computing system, a physics-based sandbox on the graphical display;
objectifying, by the computing system, each of the records to create a corresponding plurality of simulated physical objects, wherein each of the simulated physical objects defines a peripheral boundary that simulates an exterior surface of a real-world physical object;
displaying, by the computing system, the simulated physical objects in the physics-based sandbox on the graphical display;

receiving, by the computing system, a user selection of a physical-barrier-filter tool designed and configured to allow passage therethrough of each of the simulated physical objects that satisfies one or more filtering parameters applied to the physical barrier filter and to block passage therethrough of each of the simulated physical objects that does not satisfy the one or more filtering parameters;

displaying, by the computing system, a graphical representation of the physical-barrier-filter tool in the physics-based sandbox on the graphical display;

assigning, by the computing system, differing ones of the simulated physical objects to a plurality of differing layers so as to control collisions during movement of the differing ones of the simulated physical objects; and filtering, by the computing system and based on the differing layers, the simulated physical objects so as to block each of the simulated physical objects not satisfying the one or more filter parameters from passing through the graphical representation of the physical barrier filter and so as to allow each of the plurality of simulated physical objects satisfying the one or more filter parameters to pass through the graphical representation of the physical barrier filter.

44. A method according to claim 43, wherein assigning differing ones of the simulated physical objects to differing layers includes separating onto differing layers ones of the simulated physical objects that will pass through the physical-barrier-filter tool and ones of the simulated physical objects that will be blocked by the physical-barrier-filter tool so as to avoid ones of the simulated physical objects that will pass through the physical-barrier-filter tool from colliding with ones of the simulated physical objects that will be blocked by the physical-barrier-filter tool.

45. A method according to claim 44, wherein assigning differing ones of the simulated physical objects to differing layers includes assigning a first binary value to each of the simulated physical objects that will pass through the physical-barrier-filter tool and assigning a second binary value, differing from the first binary value, to each of the simulated physical objects that will be blocked by the physical-barrier-filter tool.

46. A method according to claim 45, further comprising controlling on-screen movement of the simulated physical objects based on the first and second binary values.

47. A method according to claim 43, further comprising, following said filtering, collapsing the differing layers into one or more layers.

48. A method according to claim 47, wherein said collapsing includes collapsing the differing layers into a single layer.

49. A method according to claim 47, wherein the physical-barrier-filter tool comprises a continuous semipermeable physical-barrier-tool wall forming a closed shape that surrounds at least some of the plotted locations.

50. A method according to claim 49, wherein the closed shape has an as-displayed size in the physics-based sandbox and the method further comprises receiving user input that expands the as-displayed size of the closed shape and expanding the as-displayed size of the closed shape in response to the user input.

51. A method according to claim 50, wherein said filtering occurs in realtime as the size of the closed shape is expanded.

52. A method according to claim 43, wherein prior to said filtering each of the simulated physical objects has a charted location on a chart and following said filtering ones of the simulated physical objects satisfying the one or more filter parameters are located at their charted locations on the chart and ones of the simulated physical objects not satisfying the one or more filter parameters are held by the graphical representation of the physical-barrier-filter tool in spaced relation to their charted locations on the chart against magnetic attraction between the held ones of the simulated physical objects and the charted locations of the held ones of the simulated physical objects.

53. A method according to claim 52, wherein the physical barrier filter comprises a semipermeable physical-barrier-tool razor.

54. A method according to claim 53, wherein the semipermeable physical-barrier-tool razor has a first location in the physics-based sandbox and the method further comprises:

receiving user input for moving the graphical representation of the semipermeable physical-barrier-tool razor from the first location to a second location in the physics-based sandbox that causes the graphical representation of the semipermeable physical-barrier-tool razor to encounter at least some of the simulated physical objects;

moving, on the graphical display, the graphical representation of the semipermeable physical-barrier-tool razor from the first location to the second location based on the user input; and filtering encountered ones of the simulated physical objects as the graphical representation of the semipermeable physical-barrier-tool razor is moving.

55. A machine-readable storage medium containing machine-executable instructions for performing a method of enabling a user to visualize a data set on a graphical display of a computing system, wherein the data set contains a plurality of records each having a plurality of attributes common to the plurality of records, said machine-executable instructions comprising:

a first set of machine-executable instructions for displaying, by the computing system, a physics-based sandbox on the graphical display;

a second set of machine-executable instructions for objectifying, by the computing system, each of the records to create a corresponding plurality of simulated physical objects, wherein each of the simulated physical objects defines a peripheral boundary that simulates an exterior surface of a real-world physical object;

a third set of machine-executable instructions for displaying, by the computing system, the simulated physical objects in the physics-based sandbox on the graphical display;

a fourth set of machine-executable instructions for receiving, by the computing system, a user selection of a physical-barrier-filter tool designed and configured to allow passage therethrough of each of the simulated physical objects that satisfies one or more filtering parameters applied to the physical barrier filter and to block passage therethrough of each of the simulated physical objects that does not satisfy the one or more filtering parameters;

a fifth set of machine-executable instructions for displaying, by the computing system, a graphical representation of the physical-barrier-filter tool in the physics-based sandbox on the graphical display;

a sixth set of machine-executable instructions for assigning, by the computing system, differing ones of the simulated physical objects to a plurality of differing layers so as to control collisions during movement of the differing ones of the simulated physical objects; and a seventh set of machine-executable instructions for filtering, by the computing system and based on the differing layers, the simulated physical objects so as to block each of the simulated physical objects not satisfying the one or more filter parameters from passing through the graphical representation of the physical barrier filter and so as to allow each of the plurality of simulated physical objects satisfying the one or more filter parameters to pass through the graphical representation of the physical barrier filter.

56. A machine-readable storage medium according to claim 55, wherein said sixth set of machine-executable instructions includes machine-executable instructions for separating onto differing layers ones of the simulated physical objects that will pass through the physical-barrier-filter tool and ones of the simulated physical objects that will be blocked by the physical-barrier-filter tool so as to avoid ones of the simulated physical objects that will pass through the physical-barrier-filter tool from colliding with ones of the simulated physical objects that will be blocked by the physical-barrier-filter tool.

57. A machine-readable storage medium according to claim 56, wherein said sixth set of machine-executable instructions includes machine-executable instructions for assigning a first binary value to each of the simulated physical objects that will pass through the physical-barrier-filter tool and assigning a second binary value, differing from the first binary value, to each of the simulated physical objects that will be blocked by the physical-barrier-filter tool.

58. A machine-readable storage medium according to claim 57, further comprising a set of machine-executable instructions for controlling on-screen movement of the simulated physical objects based on the first and second binary values.

59. A machine-readable storage medium according to claim 55, further comprising, machine-executable instructions for, following said filtering, collapsing the differing layers into one or more layers.

60. A machine-readable storage medium according to claim 59, wherein said machine-executable instructions for collapsing includes machine-executable instructions for collapsing the differing layers into a single layer.

61. A machine-readable storage medium according to claim 59, wherein the physical-barrier-filter tool comprises a continuous semipermeable physical-barrier-tool wall forming a closed shape that surrounds at least some of the plotted locations.

62. A machine-readable storage medium according to claim 61, wherein the closed shape has an as-displayed size in the physics-based sandbox and said machine-executable instructions further comprise machine-executable instructions for receiving user input that expands the as-displayed size of the closed shape and expanding the as-displayed size of the closed shape in response to the user input.

63. A machine-readable storage medium according to claim 62, wherein said seventh set of machine-executable instructions includes machine-executable instructions allowing the filtering to occur in realtime as the size of the closed shape is expanded.

64. A machine-readable storage medium according to claim 55, wherein prior to said filtering each of the simulated physical objects has a charted location on a chart and following said filtering ones of the simulated physical objects satisfying the one or more filter parameters are located at their charted locations on the chart and ones of the simulated physical objects not satisfying the one or more filter parameters are held by the graphical representation of the physical-barrier-filter tool in spaced relation to their charted locations on the chart against magnetic attraction between the held ones of the simulated physical objects and the charted locations of the held ones of the simulated physical objects.

65. A machine-readable storage medium according to claim 64, wherein the physical barrier filter comprises a semipermeable physical-barrier-tool razor.

66. A machine-readable storage medium according to claim 65, wherein the semipermeable physical-barrier-tool razor has a first location in the physics-based sandbox and said machine-executable instructions further comprise:

machine-executable instructions for receiving user input for moving the graphical representation of the semipermeable physical-barrier-tool razor from the first location to a second location in the physics-based sandbox that causes the graphical representation of the semipermeable physical-barrier-tool razor to encounter at least some of the simulated physical objects;

machine-executable instructions for moving, on the graphical display, the graphical representation of the semipermeable physical-barrier-tool razor from the first location to the second location based on the user input; and machine-executable instructions for filtering encountered ones of the simulated physical objects as the graphical representation of the semipermeable physical-barrier-tool razor is moving.

* * * * *